(12) United States Patent
Bernstein et al.

(10) Patent No.: US 10,904,632 B2
(45) Date of Patent: Jan. 26, 2021

(54) LIVE VIDEO STREAM SHARING

(71) Applicant: Twitter, Inc., San Francisco, CA (US)

(72) Inventors: Joseph Harold Bernstein, San Francisco, CA (US); Kayvon B. Beykpour, San Francisco, CA (US); Geraint John Davies, Bodorgan (GB); Tyler Jan Hansen, San Francisco, CA (US); Alexander Kayvon Khoshnevissan, San Francisco, CA (US); Nils Victor Rocine, San Francisco, CA (US); Aaron William Wasserman, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/565,070

(22) Filed: Sep. 9, 2019

(65) Prior Publication Data

US 2020/0007941 A1 Jan. 2, 2020

Related U.S. Application Data

(62) Division of application No. 15/076,562, filed on Mar. 21, 2016, now Pat. No. 10,455,291.
(Continued)

(51) Int. Cl.
*H04N 21/478* (2011.01)
*H04N 21/4788* (2011.01)
(Continued)

(52) U.S. Cl.
CPC ..... *H04N 21/4788* (2013.01); *H04N 21/2187* (2013.01); *H04N 21/41407* (2013.01);
(Continued)

(58) Field of Classification Search
CPC .......... H04N 21/4788; H04N 21/2187; H04N 21/41407; H04N 21/42653;
(Continued)

(56) References Cited

U.S. PATENT DOCUMENTS 5,729,471 A 3/1998 Jain et al.
8,621,502 B2 12/2013 Cronin
(Continued)

OTHER PUBLICATIONS

Twitchalerts.com, "In-Stream Popup Alerts", Nov. 4, 2014, archive.org, pp. 1-2 (Year: 2014).*
(Continued)

*Primary Examiner* — Nicholas T Corbo
(74) *Attorney, Agent, or Firm* — Brake Hughes Bellermann LLP

(57) ABSTRACT

Systems and methods provide live broadcasts with real-time feedback from viewers using mobile computing devices. An example method includes providing a live feed broadcast from a source mobile device to a plurality of viewing devices, receiving, during the live feed broadcast, an engagement from one of the plurality of viewing devices, and associating the engagement with a particular time in the live feed broadcast. The method also includes providing an indication of the engagement to the source mobile device, wherein the source mobile device displays a graphic representation of the engagement during the live feed broadcast and adding the indication of the engagement to the live feed so that a graphic representation is displayed during the live feed at the particular time to users of the plurality of viewing devices. The viewing user may each have a graph relationship with a user of the source mobile device.

20 Claims, 21 Drawing Sheets

Related U.S. Application Data

(60) Provisional application No. 62/136,191, filed on Mar. 20, 2015.

(51) Int. Cl.
*H04N 21/2187* (2011.01)
*H04N 21/414* (2011.01)
*H04N 21/61* (2011.01)
*H04N 21/426* (2011.01)
*H04N 21/431* (2011.01)
*H04N 21/432* (2011.01)
*H04N 21/43* (2011.01)
*H04N 21/442* (2011.01)

(52) U.S. Cl.
CPC ..... *H04N 21/42653* (2013.01); *H04N 21/431* (2013.01); *H04N 21/4307* (2013.01); *H04N 21/4312* (2013.01); *H04N 21/4325* (2013.01); *H04N 21/44213* (2013.01); *H04N 21/6131* (2013.01); *H04N 21/6181* (2013.01)

(58) Field of Classification Search
CPC ............. H04N 21/4307; H04N 21/431; H04N 21/4312; H04N 21/4325; H04N 21/44213; H04N 21/6131; H04N 21/6181
See application file for complete search history.

(56) References Cited

U.S. PATENT DOCUMENTS

| | | | |
|---|---|---|---|
| 8,875,208 B1 | 10/2014 | Abkairov et al. | |
| 9,344,684 B2 | 5/2016 | Worrill et al. | |
| 10,721,499 B2 | 7/2020 | Chang et al. | |
| 2002/0126120 A1 | 9/2002 | Snowdon et al. | |
| 2004/0098754 A1* | 5/2004 | Vella | H04N 21/858 725/135 |
| 2009/0009605 A1 | 1/2009 | Ortiz | |
| 2009/0063991 A1* | 3/2009 | Baron | G06Q 10/10 715/751 |
| 2009/0128631 A1 | 5/2009 | Ortiz | |
| 2009/0164484 A1 | 6/2009 | Horowitz et al. | |
| 2010/0080163 A1 | 4/2010 | Krishnamoorthi et al. | |
| 2010/0318520 A1 | 12/2010 | Loeb et al. | |
| 2011/0225515 A1 | 9/2011 | Goldman et al. | |
| 2012/0066722 A1 | 3/2012 | Cheung et al. | |
| 2012/0219271 A1 | 8/2012 | Vunic et al. | |
| 2012/0253941 A1 | 10/2012 | Van Bemmel | |
| 2012/0320013 A1 | 12/2012 | Perez et al. | |
| 2013/0042261 A1 | 2/2013 | Tavormina et al. | |
| 2013/0179911 A1 | 7/2013 | Dang et al. | |
| 2013/0347046 A1* | 12/2013 | Bluvband | G06F 3/005 725/109 |
| 2014/0007147 A1 | 1/2014 | Anderson | |
| 2014/0137144 A1 | 5/2014 | Järvenpää et al. | |
| 2014/0150032 A1 | 5/2014 | Pacor et al. | |
| 2014/0213362 A1 | 7/2014 | Perlman et al. | |
| 2014/0294361 A1 | 10/2014 | Acharya et al. | |
| 2015/0015690 A1 | 1/2015 | Roh et al. | |
| 2015/0178742 A1* | 6/2015 | Smith | H04L 67/36 705/7.29 |
| 2016/0007052 A1 | 1/2016 | Haitsuka et al. | |
| 2016/0057457 A1 | 2/2016 | Clements et al. | |
| 2016/0286244 A1 | 9/2016 | Chang et al. | |
| 2016/0294894 A1 | 10/2016 | Miller | |
| 2017/0026680 A1 | 1/2017 | Sugio et al. | |

OTHER PUBLICATIONS

Seifert, Dan; "Google Hangouts Easter eggs include shy dinosaurs and stampeding ponies"; May 17, 2013; theverge.com, pp. 1-2 (Year: 2013).*
Dashevsky, Evan; "How to Unlock 9 Hidden Animations in Google Hangouts"; Jan. 26, 2015; pcmag.com, pp. 1-11; (Year: 2015).*
Favre, Loie; "WhatsApp gets animated emoticons"; Mar. 17, 2014; nextpit.com; pp. 1-7 (Year: 2014).*
U.S. Appl. No. 15/076,562, filed Mar. 21, 2016, Allowed.
Communication pursuant to Article 94(3) for European Application No. 16713705.8, dated Oct. 9, 2019, 7 pages.
"All about Twitch"; Nov. 30, 2014, Twitch.tv, http://www.twitch.tv/p/about, 2 pages.
"Open Broadcaster Software", Dec. 14, 2014, obsproject.com, https://obsproject.com, 2 pages.
DaCrazyCageMan (username), "Do any chat overlay programs fade out when there is no chatter?", Reddit.com, https://www.reddit.com/r/Twitch/comments/2yqfda/do_any_chat_overlay_programs_fade_out_when_there/, Mar. 11, 2015, 2 pages.
DeezjaVu (username), "TeeBoard How to: Chat Widget", May 20, 2014, Youtube.com, https://www.youtube.com/watch?v=2F-1wHA_dpU, 1 page.
"Livestream on the App Store on iTunes", Livestream, retrieved from https//itunes.apple.com/us/app/livestream/id493086499?mt=8, 2014, 2 pages.
Geier, "Everything you need to know about the hot new app Meerkat", Fortune, retrieved from: http://fortune.com/2015/03/09/meerkat-app-guide/, Mar. 9, 2015, 3 pages.
International Search Report and Written Opinion for PCT Application No. PCT/US2016/023483, dated Aug. 8, 2016, 16 pages.

* cited by examiner

LIVE VIDEO STREAM SHARING

RELATED APPLICATION

This application is a divisional of, and claims priority to, U.S. application Ser. No. 15/076,562, filed on Mar. 21, 2016, titled "Live Video Stream Sharing," which is a non-provisional of, and claims priority to, U.S. Provisional Application No. 62/136,191, filed on Mar. 20, 2015, titled "Live Video Stream Sharing," the disclosures of which are incorporated by reference herein in their entireties.

BACKGROUND

Social media has become a growing part of social life. Social media users can post blogs, photos, comments, messages, locations, feelings, and videos using one or more social media platforms. Many social media users prefer to update and share information from a mobile computing device, such as a smart phone, wearable devices such as glasses and watches, tablets, etc. Such devices, because of their size, often operate with more limited resources than full size counterparts.

SUMMARY

Techniques, methods, and systems are disclosed herein for sharing live-stream video in a social media platform. The live-stream video can be propagated to viewers via a social media platform. A broadcaster of a live-stream video can broadcast to many viewers, e.g., all followers, a limited group of followers, or other social media users in general. A selection of viewers for a broadcast can be made programmatically, manually, or both programmatically and manually, based on one or more connection graphs of the platform. The broadcaster may use a camera on the broadcaster's mobile device and a user interface can allow the broadcaster to stream real-time video to a social media server. The broadcaster's device may continually (e.g., at regular periods during the broadcast) determine the throughput for the live-stream video and adjust the video quality to keep latency at around two seconds. The social media server may make the real-time video stream available to other social media users. Thus, the social media server provides a shared broadcast generated by a user without specialized equipment or networks. The live broadcast includes a closed feedback loop in which engagements from viewers are provided to the broadcaster and to other viewers in real time. For example, a viewer may comment on the broadcast, may signal approval for specific moments in the broadcast, and may invite other social media users to join the broadcast. Such engagements are provided back to viewers and the broadcaster within a latency period (e.g., two seconds or less) suitable to allow the broadcaster to react to and interact with the viewers. The broadcaster, for example, may decide to continue the broadcast when the broadcast is popular as suggested by the number of viewers, by a high level of engagements, viewer comments, and other feedback, and/or by the identity of one or more viewers. Optionally, the broadcaster may change one or more aspects of the broadcast based on these or similar information. Implementations enable a viewer to signal approval many times throughout the broadcast, rather than just one time. The social media server may provide representations of these activities to all participants in the broadcast. Thus, the broadcaster and anyone viewing the broadcast may see the comments posted and indications of approval from any viewer. In other words, the engagements form a closed feedback loop with the broadcaster and other viewers.

When a broadcast ends, the system may store the broadcast. The broadcast can be stored for only a period of time, e.g., 2 hours, 24 hours, one week, one month, etc., or may be stored indefinitely. Viewers may replay the saved broadcast and may see the comments, approvals, and notification messages at the same time in the broadcast that live viewers also saw these elements. In some implementations, the replay viewer may add additional appreciation signals. The system may optionally keep metadata for a broadcast and/or broadcaster, so that popular broadcasts and popular broadcasters can be identified. For example, the system may aggregate appreciation signals (received during the live broadcast and the replay), number of viewers, as approvals-per-minute, average approval per broadcast for a broadcaster, etc. (If the system stores or logs information about a broadcast or broadcaster, it provides notices, obtains permissions, and/or implements the appropriate measures to safeguard the information). In some implementations, live broadcasts may also be posted via other social media messages without the interactive capabilities. In some implementations, post-live comments about the message in the other social media platform may be associated with the stored version of the broadcast, e.g. as post-broadcast chat. In addition to propagating knowledge about a broadcast via a connection graph, implementations also include methods for discovering interesting broadcasts based on signals such as location, popularity, topicality, etc.

According to an aspect, a method includes providing a live feed broadcast from a source mobile device to a plurality of viewing devices, receiving, during the live feed broadcast, an engagement from one of the plurality of viewing devices, and associating the engagement with a particular time in the live feed broadcast. The method also includes providing an indication of the engagement to the source mobile device, wherein the source mobile device displays a graphic representation of the engagement during the live feed broadcast and adding the indication of the engagement to the live feed so that a graphic representation is displayed during the live feed or during subsequent playback of the live feed at the particular time to users of the plurality of viewing devices.

According to an aspect, a system includes at least one processor, a display device, and memory storing instructions that, when executed by the at least one processor, generate a user interface. The user interface may be configured to receive an acceptance of a notification regarding a live broadcast, display the live broadcast on the display device, initiate display a plurality of icons with the live broadcast, each icon representing an signal of appreciation from one of a plurality of viewers of the live broadcast and the icon being associated with a respective time in the live broadcast. The user interface may also be configured to initiate removal of icons from the display device a predetermined interval elapses after respective times, trigger display, on the display device, a plurality of notifications with the live broadcast, each notification being associated with a respective time, and initiate removal of notifications from the display based on respective times.

According to an aspect, a system includes at least one processor; and memory storing instructions that, when executed by the at least one processor, cause the system to perform operations. The operations may include determining map boundaries for display at a client device, the boundaries being based on a display scale for the client device, selecting, from among a plurality of live broadcasts, live broadcasts having a location within the map boundaries, clustering broadcasts based on the respective locations and map scale, and initiating display of a map having the map boundaries, wherein for each cluster of broadcasts, the map displays a representation of the cluster with an indication of a quantity of broadcasts in the cluster. In some implementations, the operations may also include receiving a selection of a representation for a first cluster and initiating display of at least some of the live broadcasts in the first cluster in as a list.

According to an aspect, a method includes initiating a live feed broadcast from a source mobile device, determining, at regular periods during the live feed broadcast, a throughput between the source mobile device and a server and adjusting the quality of the live feed broadcast provided to the server, so that lower throughput results in a video stream with lower quality and a higher throughput results in a video stream with higher quality, and providing the live-feed broadcast to the server, wherein the server provides the live-feed video stream to a plurality of viewing devices, wherein the source device controls the quality of the broadcast for all viewing devices.

In another aspect, a computer program product embodied on a computer-readable storage device includes instructions that, when executed by at least one processor formed in a substrate, cause a computing device to perform any of the disclosed methods, operations, or processes disclosed herein.

BRIEF DESCRIPTION OF DRAWINGS

Like reference symbols in the various drawings indicate like elements.

DETAILED DISCLOSURE

Techniques are disclosed herein for using a social media platform to create and broadcast real-time video streams to and from consumer devices with a closed feedback loop to the broadcaster. Thus, for example, a smart phone camera can be used to broadcast a live video stream to a plurality of viewers via the Internet. Implementations do not require special or expensive cameras or networks. Disclosed techniques enable a broadcaster to control the audience by restricting the broadcast to a private audience or a general audience. The general audience may initially be other people connected to the broadcaster (e.g., following or friends with) in a connection graph. Implementations may use a connection graph to determine potential viewers of a broadcast and to notify potential viewers about a live broadcast. In some implementations, viewers may invite others (e.g., followers or friends) to view the broadcast or to share the broadcast via another social media platform, for example as an attachment to a post in the other social media platform. Some implementations include a user interface that encourages a viewer to interact with the broadcaster and with other viewers. Engagements, such as repeated appreciation signals and comments, enable viewers and the broadcaster to enjoy a shared viewing experience and determine and identify favorite moments in the live video stream. Repeated appreciation signals may also be used to identify unusually popular video streams. Other engagements, such as new viewer notifications and viewer shares (invites) may help identify the community of viewers of the real-time video stream. In some implementations, such engagements may be stored with a recording of the video stream for a limited period of time, so that anyone who replays the video stream can see the engagements as if they had been part of the live broadcast. In some implementations a viewer watching the stored video stream (e.g., the replay viewer) may add engagements. Such late-added engagements may be aggregated with the other engagements received during the real-time video stream. In some implementations, the later-added engagements may also be visible on subsequent replays.

Figure 1:
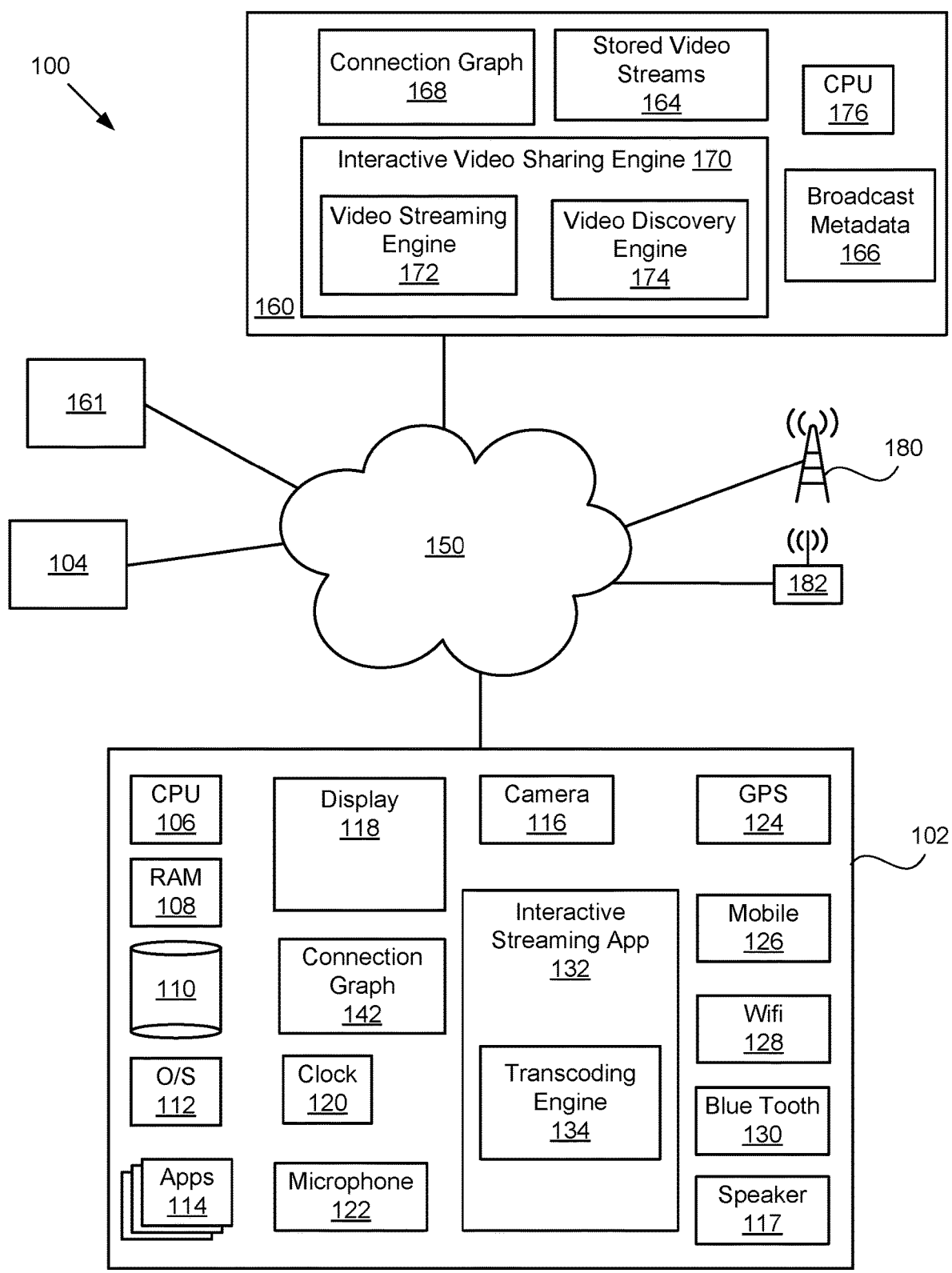
FIG. 1 is a schematic diagram of a system supporting interactive broadcast applications, according to an implementation.

FIG. 1 is a schematic diagram of a system 100 for supporting interactive broadcast applications on a consumer computing device. System 100 can thus include one or more client device(s) 102, 104 connected to one or more server computers 160, 161 through one or more networks 150. The client devices are consumer computing devices and can be a mobile computing device (e.g., a smart phone, a PDA, a tablet, a wearable device, such as a wrist or head mounted device, a virtual reality device, or a laptop computer) or a non-mobile personal computing device (e.g., a desktop computing device, internet-enabled television or entertainment system). The client device 102 can include one or more processors 106 (e.g., a processor formed in a substrate, such as a central processing unit, a graphics processor, etc.), a volatile memory 108, and nonvolatile memory 110. In various implementations, the volatile memory 108 may store, for example, instructions that are executed by the processor(s) 106, and the nonvolatile memory 110 may store, for example, various user data, instructions for executing an operating system, applications, etc. While FIG. 1 illustrates client device 102 in more detail than client device(s) 104, it is understood that client device(s) 104 include similar components.

The computing device 102 can include an operating system 112 and a plurality of applications 114, which can be executed by the computing device 102 (e.g., by the processor 106 executing one or more instructions stored in memory 108 or 110 that correspond to the application) and which may communicate with the operating system (e.g., through one or more application programming interfaces (APIs)). Execution of the applications 114 can provide various functionalities to a user of the computing device 102. In a few examples, an email application may, with a user's permission, provide access to the user's email account and email messages associated with the account. A browser application may provide a Web browser to a user, so that the user may access content that can be loaded into, and displayed by, the browser application. A social network application can provide content to the user from contacts and sources that the user has chosen to be associated with within the social media platform associated with the social network application. A camera application can provide access to a camera 116 within the computing device 102 for capturing still pictures or video. In some implementations, the camera 116 may be external to the computing device 102, such as a camera that communicates wirelessly, e.g., via BLUETOOTH or Wi-Fi, with the computing device 102. Applications that provide a rich variety of other functionalities and information to the user also can be provided. In some implementations, the interactive streaming application 132 may be considered one of the applications 114.

The computing device 102 includes a display 118 (e.g., a touchscreen display, an LED display, etc.) that can display a user interface for an application 114 that is being executed by the device. More than one application can be executed at a time. However, in some implementations (e.g., in the case of a smart phone), the size of the display is better suited for a single executing application to be displayed at a time. The executing application that is displayed on the display 118 can be referred to as a "front-facing" application.

The computing device 102 can include internal speakers 117 that can provide an audio output from the device. The computing device 102 also can include a port (not shown) that can be used to connect the computing device to external devices, e.g., speakers that may provide an audio output when connected to the device 102. The computing device 102 may also include a microphone 122 that detects sound in the environment of the device. In some implementations, the microphone 122 may be external to the computing device 102. The microphone 122, whether internal or external, may provide audio for a live video stream.

The computing device also includes a clock 120 that determines a time and date and may include a GPS transceiver 124 that communicates with a global positioning system to determine a location of the computing device 102. The location may be provided as part of the metadata associated with a real-time video stream. The computing device 102 also includes various network interface circuitry, such as for example, a mobile network interface 126 through which the computing device can communicate with a cellular network, a Wi-Fi network interface 128 with which the computing device can communicate with a Wi-Fi base station 182, a BLUETOOTH network interface 130 with which the computing device can communicate with other BLUETOOTH devices (e.g., an external camera, microphone, or speakers), and/or an Ethernet connection or other wired connection that enables the computing device 102 to access network 150. The computing device 102 may include other sensors (not shown), such as, for example, an ambient light sensor, a temperature sensor, an accelerometer, etc.

An interactive streaming application 132 may be configured to enable a user of the computing device 102 to start a real-time video stream and share the real-time video stream via a social media platform. A video stream is live or real-time when the source of the video stream is a video capture device rather than storage media. The interactive streaming application 132 may be a mobile application, or may be a web-based application. The interactive streaming application 132 may be configured to enable the user to select a privacy setting for the real-time video stream. The privacy setting controls the potential audience for the broadcast. A public broadcast is viewable by anyone using the social media platform. The social media platform may provide a message (e.g., push notification) to those directly connected to the broadcaster (e.g., following the broadcaster) in a connection graph, but anyone may join the broadcast. A private broadcast may be viewable only by those selected by the broadcaster. For example, the broadcaster may select some or all of those directly connected to the broadcaster in a connection graph (e.g., connection graph 142 or 168). As another example, the broadcaster may select those who the broadcaster is following who also follow the broadcaster in the connection graph. As another example, the interactive streaming application 132 may enable the broadcaster to select specific individuals (e.g., via a username, phone number, or other identifier) who are target viewers for a private broadcast. The viewers selected by the broadcaster may receive a message (e.g., push notification) about the live broadcast. In some implementations, for a private broadcast only those who receive the push message may view the broadcast. In other words, the target viewers cannot share the broadcast. In some implementations, social media users who are not invited to the broadcast may not be able to view the broadcast unless one of the target viewers sends an invitation to the broadcast, but the broadcaster may disable such sharing by target viewers.

The connection graph 142 may be a subset of the connection graph 162 that resides on server 160. A connection graph is a data structure representing relationships (i.e., connections) between one or more entities. For example, the connection graph 168 may be a data set that stores relationships between social media accounts. Relationships may include friending, following, linking, or some other relationship. An entity is directly connected to another entity in the connection graph when the two entities are connected by a path length of one, i.e., there are no intervening nodes.

After receiving a request from the user who wants to begin a broadcast, the interactive streaming application 132 may be configured to use various components of the computing device 102 or components in communication with computing device 102 to capture and send a real-time video stream and to display interactions (e.g., engagement representations) from viewers of the real-time video stream. For example, the interactive streaming application 132 may use the camera 116, the GPS 124, and the microphone 122 of the computing device 102 to capture a real-time video stream with audio. In some implementations, the GPS 124 may associate a location with the real-time video stream. The interactive streaming application 132 may include a transcoding engine 134, which may be configured to determine the throughput between the device 102 and the server 160 via networks 150. The throughput represents the bandwidth available to transmit the real-time video stream from device 102 to the server 160. When bandwidth is low the transcoding engine 134 is configured to reduce the video quality sent to the server 160. This differs from conventional streaming systems where the server 160 determines the video quality sent to each viewer based on the viewer's connection. In contrast, the interactive streaming application 132 decides the video quality for all viewers based on the bandwidth available to the broadcasting device 102. This ensures that latency is kept low, e.g., a few seconds or less. The low latency ensures that engagements are relevant to the broadcaster—in other words, the broadcaster receives almost real-time engagements. A latency more than a few seconds, and certainly a latency of 30 seconds or more would make engagements too old to provide effective communication between the broadcaster and the viewers.

The interactive streaming application 132 may also be configured to attach a timestamp packet to the frames of the real-time video stream provided from device 102 to the server 160. This special packet enables the server 160 associate an engagement with a particular time in the live feed broadcast. The interactive streaming application 132 may also be configured to use one of the computing components (e.g., network interface 128, mobile network interface 126, etc.) to provide the real-time video stream to a server, such as servers 160, 161. The interactive streaming application 132 may also be configured to receive engagement indications as well as metadata about the real-time video stream from the servers 160, 161. The engagement indications may be in a data stream that is associated with the video stream. The metadata may include information such as how many viewers have joined the real-time video stream and are currently viewing the video stream. The engagement indications may represent feedback and information from the viewers of the video stream. For example, the engagements may include comments, signals of appreciation, share notifications, viewer join notifications, etc. The interactive streaming application 132 may be configured to receive the data stream and to generate representations of the engagement indications in the data stream and provide the representations to the display 118.

For example, a signal of appreciation may be represented by an icon. The icon may be a heart shape, a star shape, a smiley face shape, or some other shape. The interactive streaming application 132 may be configured to add an icon to the display 118 during the real-time video stream for each signal of appreciation. Each signal of appreciation may be received from one of the viewers of the real-time video stream. A viewer may send a plurality of signals of appreciation during the real-time video stream, so that a viewer is not limited to signaling appreciation for the video stream once. Instead, the signals of appreciation may be associated with a particular moment of time in the real-time video stream and a viewer can send as many signals as desired. In some implementations, the icon representing a signal of appreciation may have a different appearance for each viewer. In other words, other viewers and the broadcaster may be able to determine how many different viewers are sending signals of appreciation based on the appearance of the icon. For example, signals of appreciation for a first viewer may be blue hearts, signals of appreciation for a second viewer may be orange hearts, signals of appreciation for a third viewer may be purple hearts, etc. Thus, each of the engagement indications may be associated with a particular viewer and the engagement representation generated by the interactive streaming application 132 for the indication may reflect a different user. In some implementations, the system may change the icon for some of all of the signals of appreciation to match a date, such as a holiday or occasion. For example, instead of hearts, on St. Patrick's Day the system may display signals of appreciation as clovers and on the Fourth of July as stars. In some implementations, the system may only change the icon for the signal of appreciation for every $n^{th}$ icon, e.g., so that every fifth or every seventh signal of appreciation is represented by a heart or star. In some implementations, the system may change the icon for some or all of the signals of appreciation based on a topic (e.g., a hashtag) identified in the content of comments. For example, if the system determines that a live video stream relates to a birthday celebration, the system may display every tenth signal of appreciation as a birthday cake icon.

The interactive streaming application 132 may be configured to trigger the display of the icons (e.g., representations of signals of appreciation) for a predetermined period of time. For example, each icon may appear on the display 118 of the computing device 102 for three or five seconds and then disappear or fade out. The engagement may be associated with a specific time, e.g., a timestamp from a timestamp packet in the video stream, and an engagement may be displayed during a period that starts at the timestamp until the predetermined period of time expires. In some implementations, the interactive streaming application 132 may be configured to animate the icons on the display 118 while displayed. For example, the interactive streaming application 132 may cause the icons to move from a first location to a second location during the predetermined period of time. The movement need not be linear, but may be in a general direction. For instance, the icon may float up or sink down a side edge of the display 118 or move generally across a top or bottom edge of the display 118 during the predetermined time. The interactive streaming application 132 may be configured to display and animate a plurality of the icons, each icon representing a single signal of appreciation. The icons may overlap with each other in the display.

The interactive streaming application 132 may also be configured to trigger the display of engagement notifications, such as comments from viewers, viewer join notices, and viewer share notifications. The engagement notifications may be displayed with the real-time video stream (and the icons representing signals of appreciation). Like the icons, the engagement notifications may be associated with a moment in time (i.e., a timestamp) and displayed for a predetermined period of time after the moment in time, so that after the predetermined time the notification fades out, for example. The interactive streaming application 132 may scroll comments, so that older comments are moved up (or down or sideways) to make room for new engagement notifications. Thus, while a user of the computing device 102 is providing a real-time video stream, the user of the computing device 102 may also receive real-time feedback from the viewers of the real-time video stream. In some implementations, the interactive streaming application 132 may also be configured to allow the user to share the real-time video stream via the social media platform. When the user shares the video stream, the interactive video sharing engine 170 may be configured to send a message to user accounts directly connected to the user in a connection graph for the social media platform. In some implementations, the message may be a push notification or an email with a control (e.g., link) that allows the invited user to join the video stream. In some implementations, the targeted viewer (e.g., the viewer receiving the notification) may join via a consumer computing device with the interactive streaming application 132 installed. In some implementations, the targeted viewer may join via a browser application or another mobile application without using the interactive streaming application 132, which may include viewing the real-time video without engagements.

In some implementations, the system may enable the live broadcast to be posted via other social media platform messages. Such posts may include the video stream but may lack the interactive capabilities. Thus, for example, a social media user in a different platform can receive a message formatted for the different platform that includes the video stream that the social media user can watch. Such a message can include a suggestion that the social media user download and install a version of the interactive streaming application 132, or include a link or other control that opens the interactive streaming application 132 or initiates the install. In some implementations, the server 160 may associate comments about the message from the other social media platform with a stored version of the broadcast, e.g. as post-broadcast chat engagements.

The interactive streaming application 132 may be configured to provide the real-time video stream from a broadcasting computing device 102 to a server, such as servers 160, 161. The server 160 may be a single computing device, or may be a representation of two or more distributed computing communicatively connected to share workload and resources. In some implementations, the server 160 is a social media platform server. The server 160 may also include one or more processors 176 formed in a substrate configured to execute instructions. The instructions may be stored in memory, such as RAM, flash, cache, disk, tape, etc. In addition, the server 160 may include one or more data stores configured to store data in a persisting manner. For example, the server 160 may store a connection graph 168. The connection graph 168 may be a data structure representing relationships (i.e., connections) between one or more entities. For example, the connection graph 168 may be a data set that tracks relationships between social media accounts. Relationships can include friending, following, liking, linking, or some other relationship. In some implementations the connection graph 168 may represent entities that have installed an interactive streaming application 132 and set up a user account through the interactive streaming application.

In some implementations, the connection graph 168 may represent entities from more than one social media platform or entities that have installed various social media applications. Thus, the connection graph 168 may be understood to represent multiple distinct data sources, each representing a separate set of entities and relationships for separate social media platforms. In some implementations, a first user account in one data store may include an identifier for a second user account in a second data store, where the first user account and the second user account correspond to a single human user. Thus, the interactive video sharing engine 170 may be able to access the second data store via the link between the first user account and the second user account. The system may thus access a second social media platform via such connected accounts. The human user may have control over such connections.

The server 160 may also store broadcast metadata 166. Broadcast metadata 166 may store data, e.g., information and statistics, for real-time broadcasts and/or broadcasters. The data may include the engagements received during the live broadcast (and in some implementations, from replays of the stored broadcast), the total quantity of viewers, how long each viewer watched the real-time broadcast, etc. The server may also store stored video streams 164 for a limited time. For example, when a broadcaster completes a real-time broadcast, the broadcaster may choose to make the video stream available for replay. Accordingly, the server 160 may store the video stream in stored video streams 164. The stored video stream may include the engagement indications associated with the video stream. In other words, when the stored video stream is replayed, the viewer watching the replay may also see any engagements received during the real-time video stream.

The server may also include an interactive video sharing engine 170. The interactive video sharing engine 170 may service a social media platform, and thus, have access to the connection graph 168 for the social media platform. The interactive video sharing engine 170 may include a video streaming engine 172 and a video discovery engine 174. The video streaming engine 172 may be configured to provide the transcoded video stream, including any added engagement indications, to client viewing devices (i.e., other instances of device 102) in a format appropriate for a particular client viewing device. The interactive video sharing engine 170 may be configured to receive the video stream from a broadcasting consumer device (e.g., smartphone or wearable computing device) and to provide it in a variety of different formats for playback on client viewing devices. Thus, the interactive video sharing engine 170 may convert the live video stream from the broadcaster into a plurality of formats and, when a viewing device joins the real-time video stream, the video streaming engine 172 may select, based on information about the viewing device, an appropriate format for the viewing device. The interactive video sharing engine 170 may be configured to receive engagements from the client viewing devices and provide engagement indications with the video stream provided to the various client devices. The interactive video sharing engine 170 may also provide the engagement indications to the broadcasting device. The engagement indicates may be associated with a particular time in the real-time video stream. For example, an engagement may be associated with the time represented by a timestamp packet associated with the video frame displayed when the engagement was received.

The interactive video sharing engine 170 may be configured to receive a request to start a real-time video stream from a broadcasting computing device 102. The request may include information from which the interactive video sharing engine 170 can determine target viewers. For example, the interactive video sharing engine 170 may use the connection graph 168 to determine user accounts directly related to the account for the broadcaster. These directly related user accounts may receive a message, for example a push notification, regarding the broadcast. In some implementations, only user accounts that have a "following" relationship with the account corresponding to the broadcaster may receive the message. When the broadcast information indicates the broadcast is private, the information may include identifiers (e.g. user account identifiers) for user accounts that can receive the message (e.g., push notification) about the live video stream. Thus, in some implementations, a private broadcast may be for a subset of the user accounts directly related to the broadcaster account in the connection graph 168 (e.g., followers), whereas a public broadcast can be joined by anyone, but only accounts directly related to the broadcaster are notified of the live video stream.

Based on the information received with the real-time video stream and the connection graph 168, the interactive video sharing engine 170 may send messages to the targeted viewers. The message may be in the form of a push notification, but can be an email, or a text that includes a link or activation that connects the target viewer to the real-time video stream. In some implementations, the targeted viewer may only view the real-time video stream if the computing device used by the targeted viewer has an interactive streaming application 132 installed. The interactive streaming application 132 may be a mobile application or a browser-based application. Once a targeted viewer chooses to join the real-time video stream, the video streaming engine 172 may provide the encoded real-time video stream to the viewer, e.g., via computing device 102 or 104.

The interactive video sharing engine 170 may be configured to receive engagements from viewers, associate an engagement with a moment of time, and provide engagement indications with the video-stream to client viewing devices and the broadcasting device. An engagement is some type of interaction from one of the viewers. For example, a signal of appreciation is a type of engagement where a viewer expresses approval at a particular moment during the real-time video stream. The moment in time may be represented by the time in a timestamp packet associated with the frame that was being displayed when the engagement was received by the client device. Another example of an engagement is a comment provided by a viewer. Another example is a share, which may have a corresponding share notification telling other viewers and the broadcaster that a viewer has invited other viewers. In some implementations, only a public broadcast may allow sharing. In some implementations, the broadcaster can control whether viewers can invite other viewers to a private broadcast. Another example of an engagement is a new viewer joining the broadcast, which may be associated with a new viewer notification alerting the broadcaster and other viewers of the new viewer. The video streaming engine 172 may provide indications of the engagements with the video stream to encourage interaction among the viewers and broadcaster. In some implementations, the interactive video sharing engine 170 may aggregate the different types of engagements, generating statistics for the broadcast. For example, the interactive video sharing engine 170 may track the number of signals of appreciation received from all viewers per minute, track the total number of signals of appreciation, track the comments per minute, track the total number of comments, track the total number of viewers, track the average viewing time of the viewers, track the number of shares, etc. The statistics may be stored as broadcast metadata 166. The broadcast metadata 166 may be used to feature popular broadcasts (e.g., measured by number of viewers, average of signals of appreciation per second, correspondence with social media messages or other broadcasts, etc.) for replay, to suggest popular broadcasters (e.g., based on total number of signals of appreciation received over all broadcasts or based on a high average number of signals of appreciation per second across all the broadcasts for the broadcaster, etc.), to notify potential audience members about a popular live broadcast, etc.

The interactive video sharing engine 170 may include video discovery engine 174. The video discovery engine 174 may enable the interactive video sharing engine 170 to suggest real-time video streams and/or stored video streams, e.g., in stored video streams 164, to a viewer. In some implementations, the video discovery engine 174 may use the broadcast metadata 16 to provide or suggest real-time video streams to a user. For example, the video discovery engine 174 may suggest a real-time video stream that has received many signals of appreciation in a short duration, a real-time video stream that has a quantity of viewers that exceeds a threshold, a real-time video stream that has an average number of engagements per second that exceeds a threshold, etc. The video discovery engine 174 may boost the position of a real-time video stream in the search result based on attributes of the user. For example, the video discovery engine 174 may boost a real-time video stream associated with a known interest of the user in the search result. The video discovery engine 174 may determine an interest for the real-time video stream based on words in the title or comments, or landmarks identified in the video stream. For example, the video discovery engine 174 may determine that a real-time video stream titled "Vail black diamond" is associated with skiing, which may be a known interest of a particular user and the video discovery engine 174 may boost the ranking of this video stream for that user in a list of suggested video streams. Similarly, the video discovery engine 174 may associate the video stream with skiing based on the content of comments.

In some implementations, the video discovery engine 174 may use other social media messages to determine an interest for the user. For example, a user may post or re-post messages in a first social media platform that include hashtags. A hashtag may be used to identify messages about a particular topic and can be used to identify trending topics. The video discovery engine 174 may be in communication with the first social media platform and may identify topics the user has recently posted and may give any real-time video streams that include the topic in the comments (e.g., use the same or similar hashtag) a position of prominence in a list of suggested real-time video streams for that user. As another example, the video discovery engine 174 may determine a topic, e.g., related to one or more hashtags, that is trending, or in other words being used by many different users of the first social media platform. Any real-time video streams that also include comments with that topic may be listed in a position of prominence in a list of suggested real-time video streams for users of the interactive streaming application 132.

The video discovery engine 174 may also use location data to suggest real-time video streams for viewing. For example, the video discovery engine 174 may identify several real-time video streams that are in close proximity to each other. Such real-time video streams may be an indication of an important event occurring at the location. The video discovery engine 174 may suggest one or more of these real-time video streams (e.g., selected at random, based on past popularity of the broadcaster, based on number of viewers of the stream, etc.) as a suggested real-time video stream. In some implementations, the video discovery engine 174 may initiate a user interface that shows the location of the real-time video streams and enables a user to select one of the real-time video streams for preview of viewing. For example, the user may navigate in a map that includes an icon representing the location of live video streams and the user may select an icon to join or preview the live video stream associated with the location.

In some implementations, the video discovery engine 174 may receive a query from a user and search titles of live video streams and/or comments provided in live video streams and provide video streams with responsive titles or comments in a search result to the viewer. The video discovery engine 174 may also search titles and comments for stored video streams and provide one or more stored video streams in the search result. Although described above as a live video stream search tool, the video discovery engine 174 may use similar techniques to search and surface recorded video streams, e.g., those stored in stored video streams 164. The video discovery engine 174 may interact with a user interface in the interactive streaming application 132 to receive input from the user and display results, e.g., a list of live or stored video streams, to the user.

The interactive streaming application 132 of consumer computing device 102 may also be configured with a viewing user interface that enables a potential viewer to receive a notification about a live video stream, join the stream, and provide feedback in the form of comments or signals of appreciation, to invite others (when approved by the broadcaster), and to share via a social media platform. The interactive streaming application 132 may also be configured to enable a user of the computing device 102 to update the connection graph (e.g., connection graph 162 and/or 142) to enable the user to receive notifications to join real-time broadcasts from a particular account (e.g., an account of the social media platform). For example, the interactive streaming application 132 may help a first user account follow or like a second user account, so that broadcast notifications from the second user account are presented to the first user.

The interactive streaming application 132 may be configured to display messages regarding live video streams. A live video stream is one that occurs in real-time, as the broadcaster captures the image. In other words, in a live or real-time video stream the source of the video stream is a video capture device (e.g., camera 116). In contrast the source of a replay of a video stream is storage media. If a user chooses to view the live video stream, the interactive streaming application 132 may display the real-time video stream on the display 118 of the viewer's computing device. The interactive streaming application 132 may also be configured to enable the user to provide engagements during the live video stream. For example, when a user provides an appreciation gesture, such as a tap on a touch screen display 118 or use of an input device, such as a mouse, to click in the display 118, while watching the live video stream, the interactive streaming application 132 may interpret the tap or click as a signal of appreciation. The interactive streaming application 132 may provide information about the signal of appreciation to the server 160. The information about the engagement may include an identifier for who provided the signal and when it was provided, for example by identifying the time in the timestamp packet associated with the frame being displayed when the engagement was received. At the server 160, a video streaming engine 172 may receive the engagements and may provide information about the engagements to the viewers and the broadcaster. This information may be used, at each client device 102, 104, to generate representations of the engagement, as described above. Thus, the video streaming engine 172 provides information to all participants participating in the real-time video stream about engagements from any of the viewers.

The interactive streaming application 132 may also enable a viewer to enter comments, which are provided to the interactive video sharing engine 170 at server 160. The interactive video sharing engine 170 may provide information about this engagement, such as the initials or username of the viewer providing the comment, as well as the content of the comment and a timestamp for the comment to viewing devices. In addition to comments, the interactive streaming application 132 may enable a viewer to invite others to view the live video stream. For example, anyone connected to the viewer via the connection graph 168 or 142 may receive a message with an invitation to join the live video stream. The interactive streaming application 132 may also enable a viewer to leave the broadcast or rejoin the broadcast at any time.

Once a broadcast completes, the interactive video sharing engine 170 may store the video stream formats and the engagement indications that correspond to the video stream, for example storing them in stored video streams 164. In some implementations, the broadcaster can prevent the video stream from being stored at the server 160. The interactive video sharing engine 170 may store the engagement indications with the stored video stream, as well as the broadcast metadata. The interactive video sharing engine 170 may delete the stored video stream after the limited time expires. For example, the interactive video sharing engine 170 may delete any saved video streams that are more than 12 or 24 hours old, depending on the length of the limited time. In some implementations, the interactive video sharing engine 170 may enable viewers to select a stored video stream for replay. In some implementations, only those in the original audience (e.g., those indicated by the broadcaster in a private broadcast, or only those following a broadcaster) may replay the video stream. In some implementations any viewer may replay the stored video stream.

During replay of a stored video stream, the interactive video sharing engine 170 may receive additional engagements from the replay viewer. In some implementations, the interactive video sharing engine 170 may aggregate the engagements with the broadcast metadata 166 for the stored video stream. For example, if the replay viewer provides several signals of appreciation, the interactive video sharing engine 170 may add these to the statistics for the broadcast. In some implementations, the interactive video sharing engine 170 may optionally add the engagements to the stored video stream. For example, the signal of appreciation from the replay viewer may be assigned a time and engagement indicator in the stored video stream. In some implementations, the replay engagement may include sharing the stored video stream. Sharing may include sending a message, e.g., via a social media platform, with a link or other element that enables others to find and replay the stored video stream.

In some implementations, the interactive streaming application 132 may provide a user interface that enables a user of the computing device 102 to select a stored video stream for replay. For example, the server 160 may store video streams for a limited time (for example 12 or 24 hours). This provides an opportunity for targeted viewers (e.g., followers receiving a push notification) who missed the live video stream to view a stored version of the video stream. The replayed version includes all engagement indications received during the live video stream. Thus, the replay viewer can experience the interactions that occurred during the live video stream. In some implementations, the replay viewer may also be able to add engagements to the stored video stream. In other words, a replay viewer may add signals of appreciation and/or comments. In some implementations, these engagements may be aggregated with metadata for the broadcast, for example in broadcast metadata 166. In some implementations, the new engagement indications may be stored with the stored video stream, so that other replay viewers watching the stored video stream at a subsequent time can see the new engagements added after the live video stream ended.

FIGS. 2A, 2B, 2C, 2D, and 2E are schematic diagrams illustrating graphical user interfaces (UIs) in which a broadcaster shares a live broadcast via a social media platform and receives interaction during the broadcast. The graphical user interfaces of FIGS. 2A, 2B, 2C, 2D, and 2E may be generated by an interactive streaming application, such as interactive streaming application 132 of system 100 of FIG.

Figure 2A:
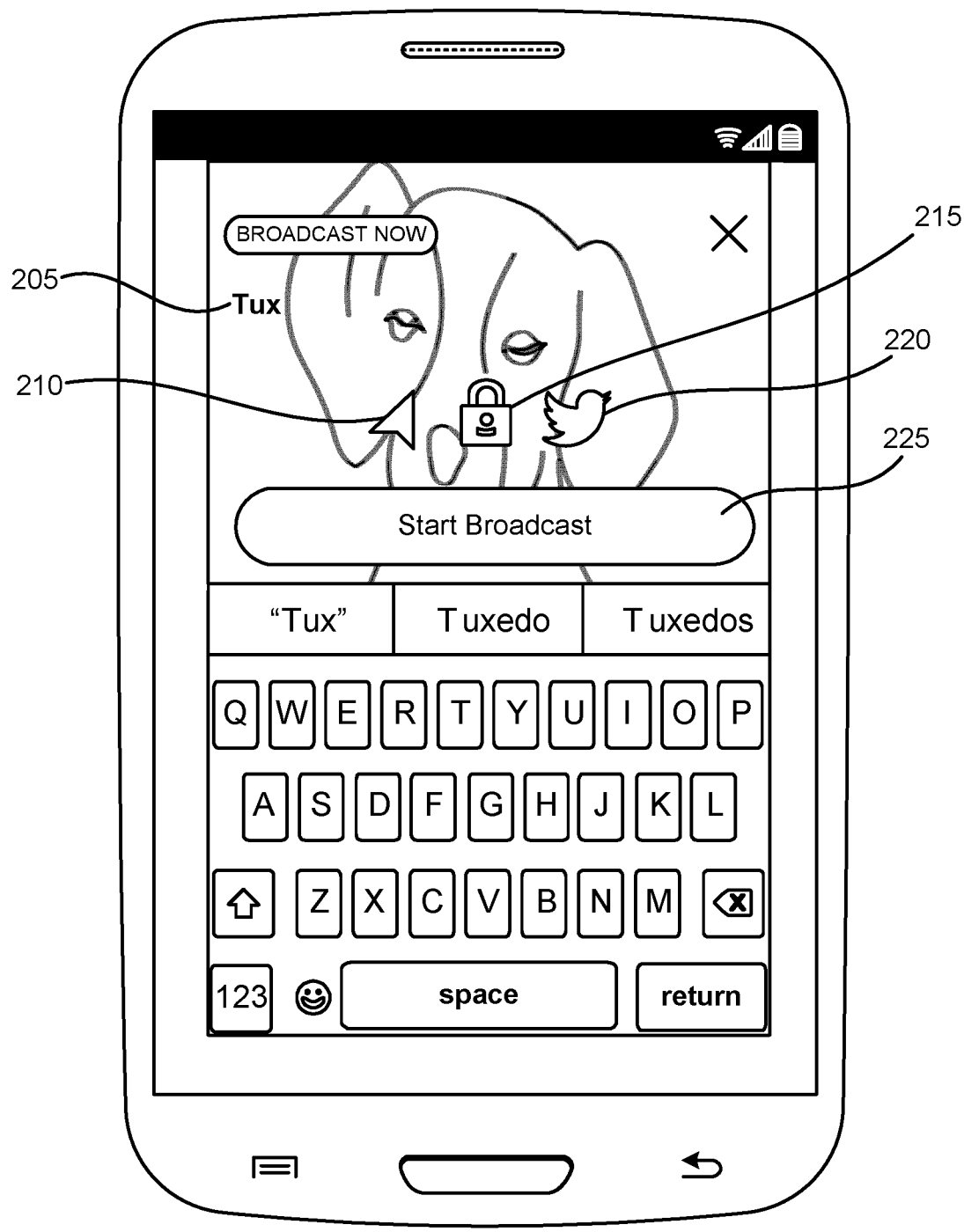
FIGS. 2A, 2B, 2C, 2D, and 2E are schematic diagrams illustrating graphical user interfaces (UIs) in which a broadcaster shares a live broadcast via a social media platform and receives interaction during the broadcast, according to an implementation.

1. While the computing device illustrated in FIGS. 2A, 2B, 2C, 2D, and 2E is a consumer mobile computing device, it is understood that the graphical user interface may be generated for another type of consumer computing device, such as a desktop or laptop computer running a browser. FIG. 2A illustrates an example user interface 200 for starting a broadcast. The user interface may include privacy selection controls 210, 215, and 220. The privacy selection control 210 may represent a public broadcast. A public broadcast may be accessible by any user with an account in a connection graph (e.g., connection graph 168). Messages may be sent to user accounts directly connected to the user account of the broadcaster (e.g., the user using the interface illustrated in FIG. 2A) in the connection graph. In some implementations, any user with a user account in the connection graph may see that the broadcast is occurring when the broadcast is public and live. In some implementations, a public broadcast may be stored and replayed by any user with a user account in the connection graph. The privacy selection control 215 may represent a private broadcast. In some implementations, the audience for a private broadcast may be limited to users with user accounts having a direct relationship with the broadcaster's user account in the connection graph. In some implementations, selection of the control 215 may cause the system to display another user interface (not shown) where the broadcaster can select a subset of followers (i.e., from user accounts with a direct relationship with the broadcaster's user account in the connection graph) as the audience for the broadcast. If the broadcaster selects a subset of followers, the system may send broadcast messages (e.g., via a push notification or email) to only the subset of followers.

The user interface 200 may also include privacy control 220, which may allow the broadcaster to expand the audience by extending the connection graph to another social media platform. For example, in one implementation, selection of control 220 may expand the connection graph and, therefore, the audience. For example, the user interface 200 may be associated with a first application that uses a first connection graph. The control 220 may be associated with a second connection graph in a different social media platform. The broadcaster may have followers (i.e., direct connections) in each connection graph. Selecting the control 220 may allow the broadcaster to expand the audience by including followers in the second connection graph. In some implementations, control 220 may expand the audience by sending the real-time video stream with engagements via the second social media platform. For example, selection of control 220 may cause the system to share the real-time broadcast that the broadcaster sees (e.g., with engagement representations added) via a message in the second social media platform. Those following the broadcaster in the second social media platform may not be able to add engagements to the real-time video broadcast themselves, but may see the video stream with the engagement representations that the broadcaster sees. The message in the second social media platform may include a suggestion to use the interactive streaming application to join the real-time video stream. In some implementations, this suggestion may include a link or other control that initiates download and install of the interactive streaming application and/or switching focus to the interactive streaming application.

Figure 2B:
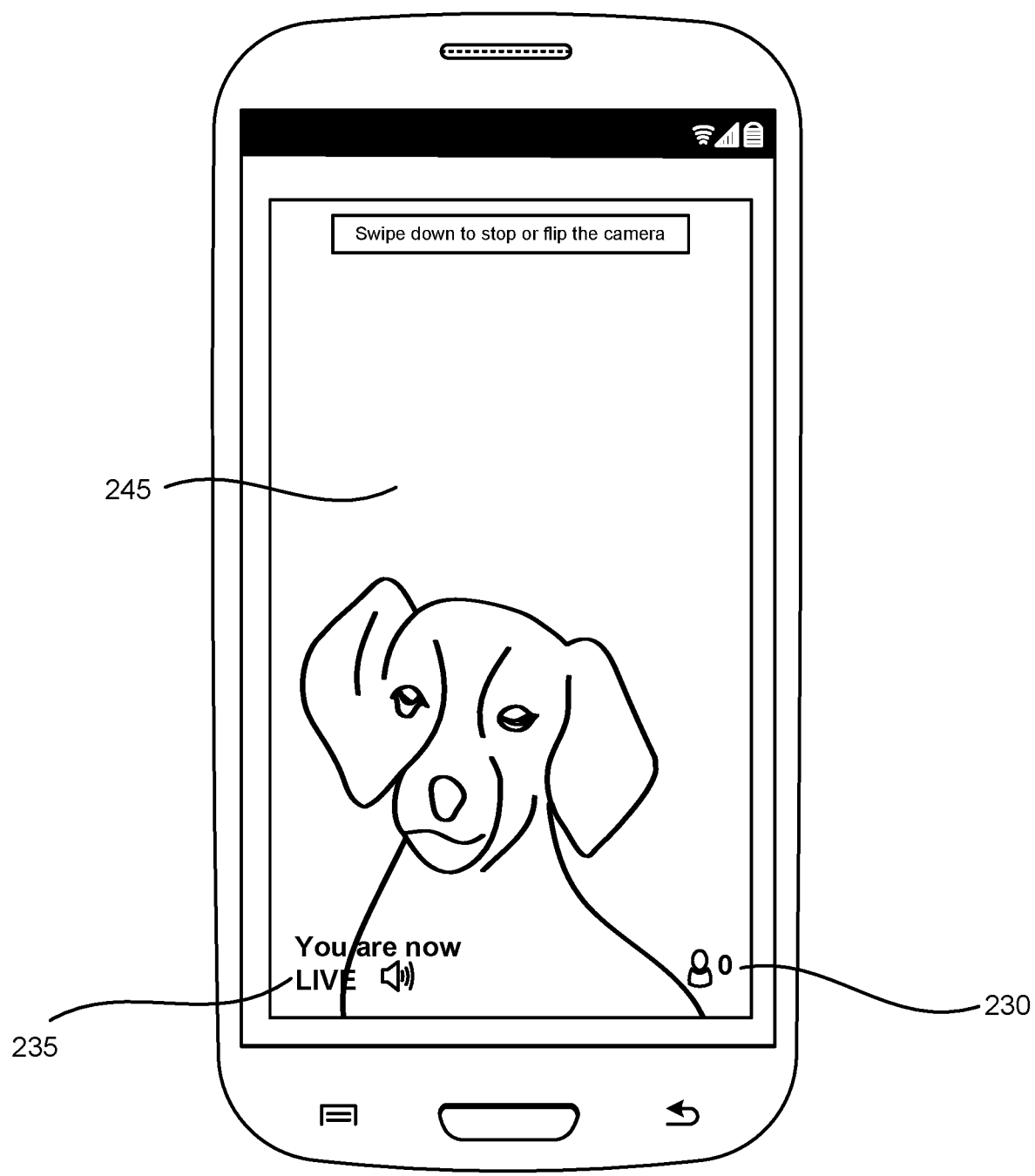

The user interface 200 may also include a title 205 of the real-time video stream (i.e., the broadcast). The broadcaster may provide the title 205, which can be used to identify the broadcast during the real-time stream and in a list of stored video streams. The user interface 200 may also include control 225, which begins the real-time transmission of a video stream from the consumer computing device to the server (e.g., server 160 of FIG. 1). FIG. 2B illustrates an example user interface 201 of a beginning portion of a broadcast via a social media network, in accordance with an implementation. The user interface 201 may be generated by an interactive streaming application installed on the consumer computing device. The user interface 201 may include a viewing area 245, in which the broadcaster can see the video stream. The user interface 201 may also include a notification 235 that the video stream is live, or in other words available for viewers to join. The user interface 201 may also include a viewer indication 230, which tells the broadcaster the number of viewers joined in the real-time video stream. When a real-time video stream first goes live, the number of viewers is zero because no viewers have yet joined the real-time video stream. In order to maximize the viewing area 245, the user interface 201 may hide additional controls, but may include a notification that the additional controls (such as stop or flip camera) can be accessed via a gesture. The gesture can be, for example, swiping down, double tapping, long tap, or some other gesture.

Figure 2C:
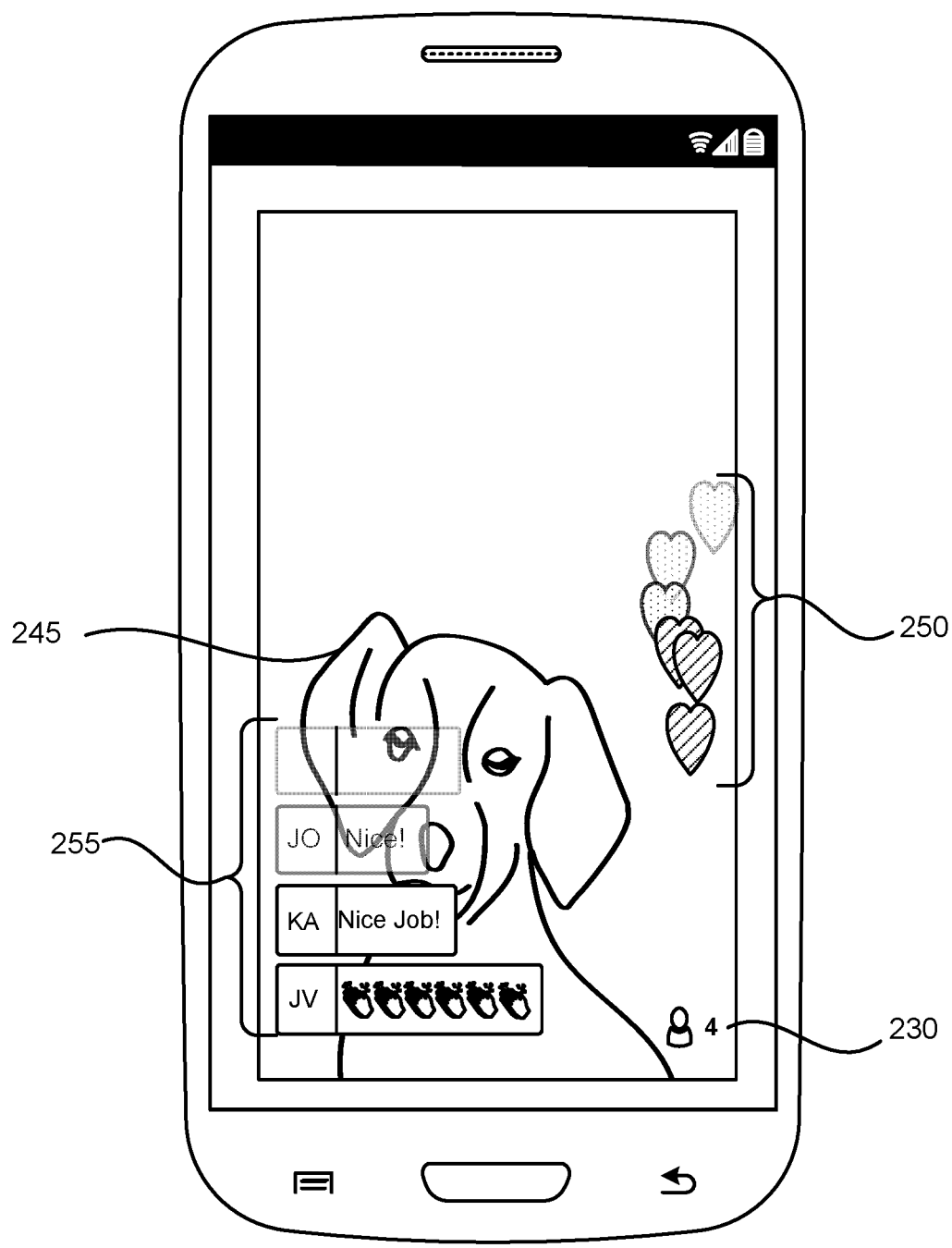

During the live broadcast viewers may join the broadcast. FIG. 2C illustrates an example user interface 202 of a broadcast that includes engagement representations, according to an implementation. In the example of FIG. 2C, three viewers have joined the broadcast, as illustrated by updated viewer indication 230. The three viewers have provided engagements in the form of signals of appreciation represented by icons 250 and comments 255. The icons 250 are an example of a type of engagement representation. The social media server may provide indications of the engagements and the video interaction engine may trigger display of the representations of the engagement representations, such as icons 250 and comments 255. Each of the icons 250 represents a single signal of appreciation from one of the three viewers. The appearance of the icons (e.g., color such as yellow hearts vs. pink hearts, or fill such as stripe fill vs. dotted fill) may serve to differentiate the source of the signal of appreciation. For example, signals of appreciation may be yellow for a first viewer and pink for a second viewer. Thus, the icons 250 show that two viewers have each provided three signals of appreciation. In some implementations, the system may alter the icon used to display a signal of appreciation based on the date of a broadcast and/or the topic. For example, a broadcast taking place on Halloween may include pumpkin shaped icons for one or more of the signals of appreciation. Similarly, if the system determines the broadcast relates to skiing the system may use a snowflake icon. The system may use hashtags from comments or the title of a broadcast to determine one or more topics for the broadcast. The user interface 202 may be configured to display the icons representing signals of appreciation for a limited time and, in some implementations, may be configured to animate the icons. In other words, after an icon appears in the viewing area 245, the system may be configured to make the icon move (for example, floating up) and then fade out and disappear from the viewing area 245 after a predetermined time. In some implementations, the icons may not move, but may appear at different locations in the viewing area 245 for a period of time and then fade out.

In addition to the icons 250, the user interface 202 may display comments 255. Comments 255 are another example of a type of engagement representation. The comments may include text, emoticons, emoji, or other content provided by one of the viewers. In some implementations, the comment 255 may include an indication of the identity of the viewer who submitted the comment. In the example of FIG. 2C the indication of the identity of the viewer in the comments 255 is the initials of the viewer, but the indication could be a picture associated with the viewer, an avatar, or some other indication. The comments 255 may be configured to scroll, so that newer comments appear at the bottom and cause older comments to move up (or vice versa). Comments 255 may also be configured to disappear after a period of time. For example, comments that have been in the viewing area 245 for five seconds may disappear and fade out. In addition to the comments 255, the engagement representations may include notifications that identify viewers joining the broadcast and shares of the broadcast by viewers. These notifications are not illustrated in FIG. 2C, but will be illustrated herein. The user interface 202 thus enables the broadcaster to receive feedback about the live broadcast during the broadcast and participate in the interactive video stream. Thus, the broadcaster could provide oral commentary on the comments or thank the viewers for the signals of appreciation during the broadcast.

Figure 2D:
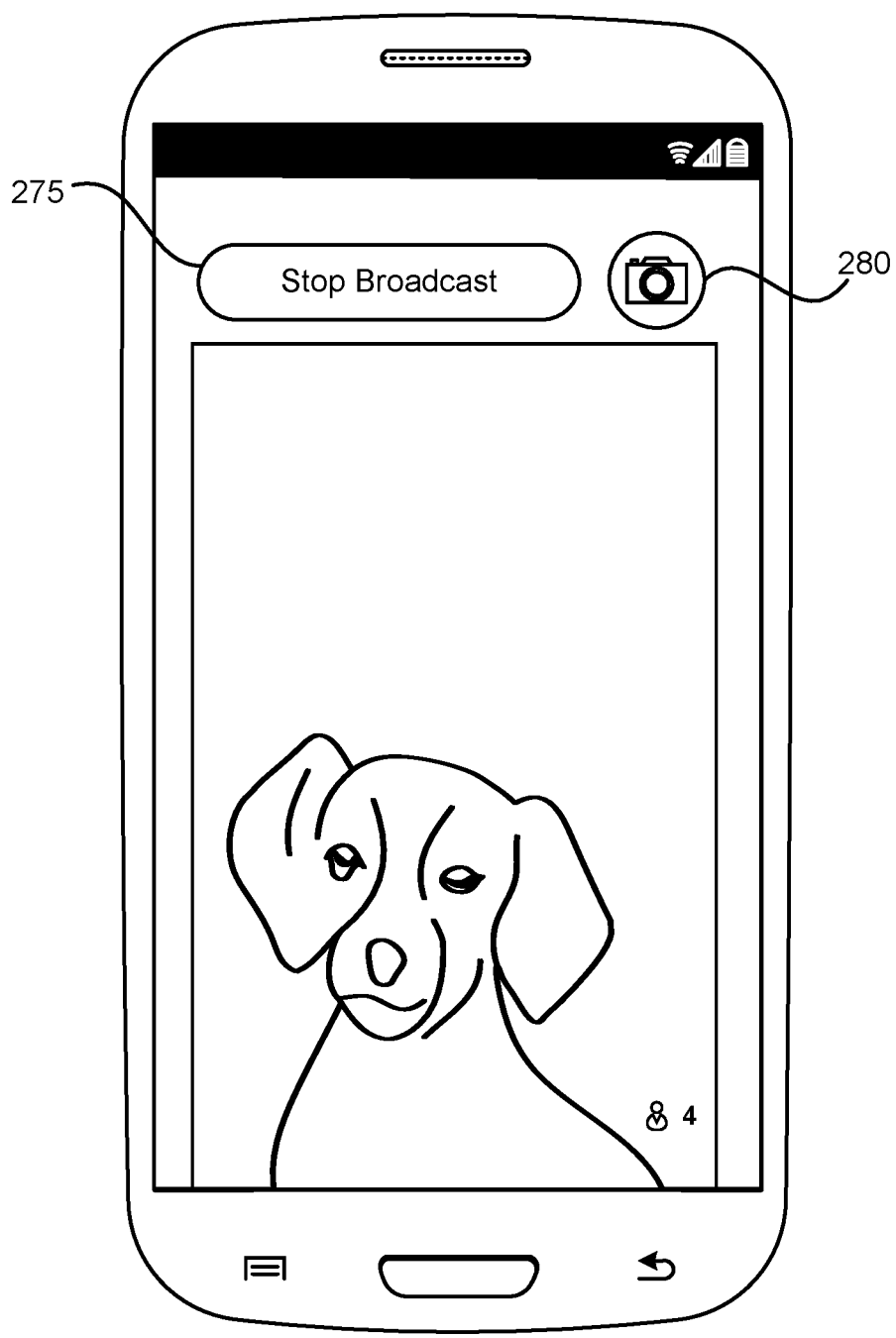

FIG. 2D illustrates an example user interface 203 with additional controls for the broadcaster. The broadcaster may trigger display of the user interface 203 with a predefined gesture (for example swipe down). The user interface 203 includes control 280, which may enable the broadcaster to change the camera view from forward-facing to a rear-facing or "selfie" mode. The selection of control 280 does not interrupt the video stream, but does toggle between the forward and rear facing camera views. The user interface 203 also includes control 275, which terminates the real-time video stream when selected.

Figure 2E:
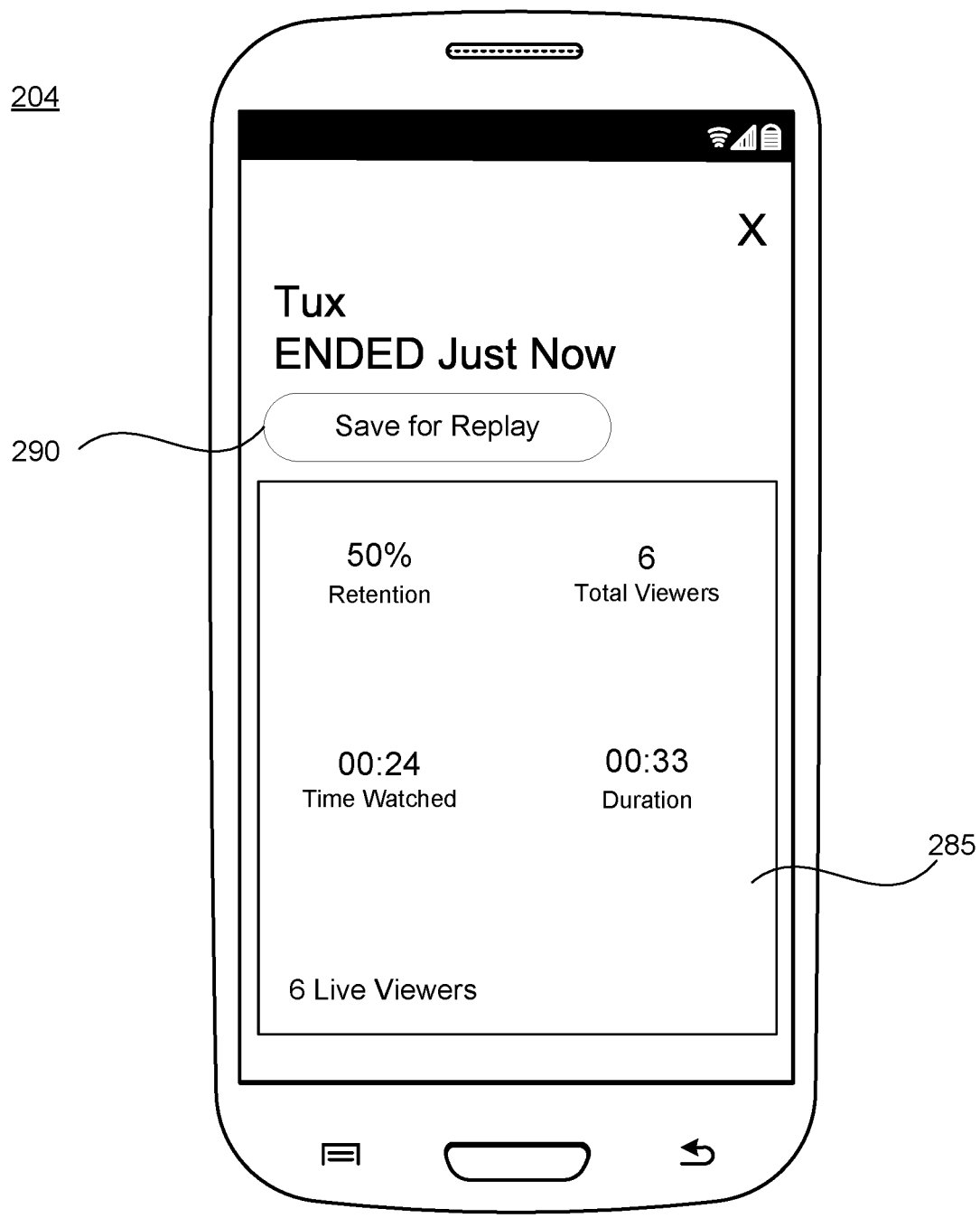

FIG. 2E illustrates a user interface 204 that appears after the broadcaster selects control 275 of FIG. 2D and terminates the broadcast. The user interface 204 may provide broadcast metadata 285 to the broadcaster. The broadcast metadata 285 may include statistics about the number of viewers, how long viewers watched the broadcast, and can include the number of signals of appreciation, the number of comments, the number of shares by viewers, the average number of signals of appreciation per second, the average number of comments received per second (or ten seconds, etc.) the highest number of signals of appreciation received in a five second period, etc. In some implementations, the statistics may be presented in graph format. The broadcast metadata may be stored at the social media server, which enables the social media server to identify popular broadcasters. The broadcast metadata may also help identify popular broadcasts, which can be suggested for replay to audience members who missed the live video stream. The user interface 204 may also include control 290, which enables the broadcaster to save the video for replay. In some implementations, saving a video for replay may be the default and the control 290 may stop the server from saving the video for replay. In some implementations, the stored video stream may have the same audience as the real-time video stream. In other words, a private broadcast is available for private replay, and a public broadcast is available for public replay. In some implementations, videos may only be available for replay if the viewer is directly connected to the broadcaster in a connection graph or if the viewer is directly connected to someone who shared the video (whether during the live broadcast or during replay). A video saved for replay may be saved for a limited time on the social media server. For example, after a video has been completed for more than 12 or 24 hours (or some other period of time), the social media server may delete the saved video stream.

Figure 3A:
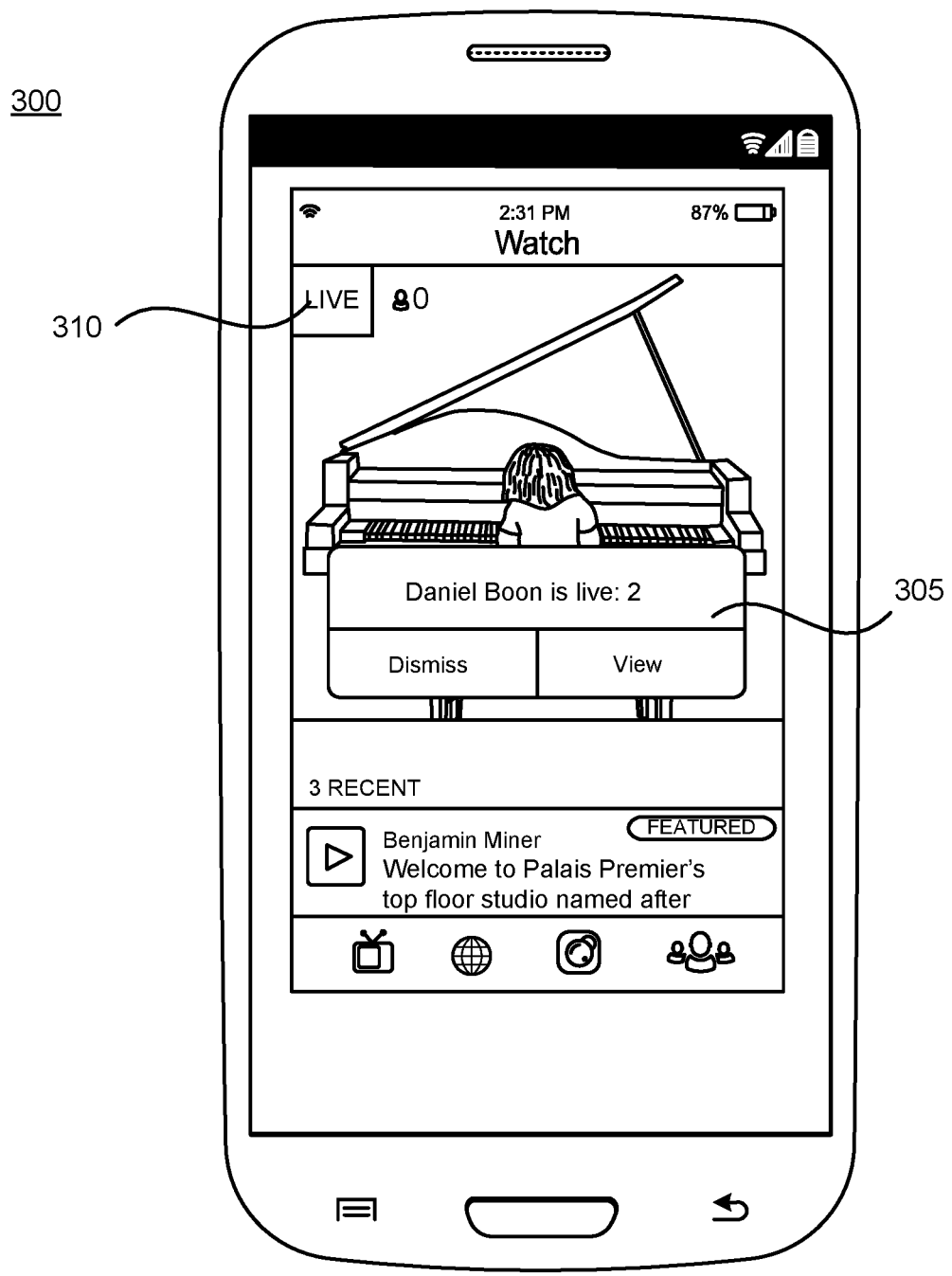
FIGS. 3A, 3B, and 3C are schematic diagrams illustrating graphical user interfaces (UIs) enabling viewers to join a live broadcast and provide engagements during the broadcast, according to an implementation.
Figure 3B:
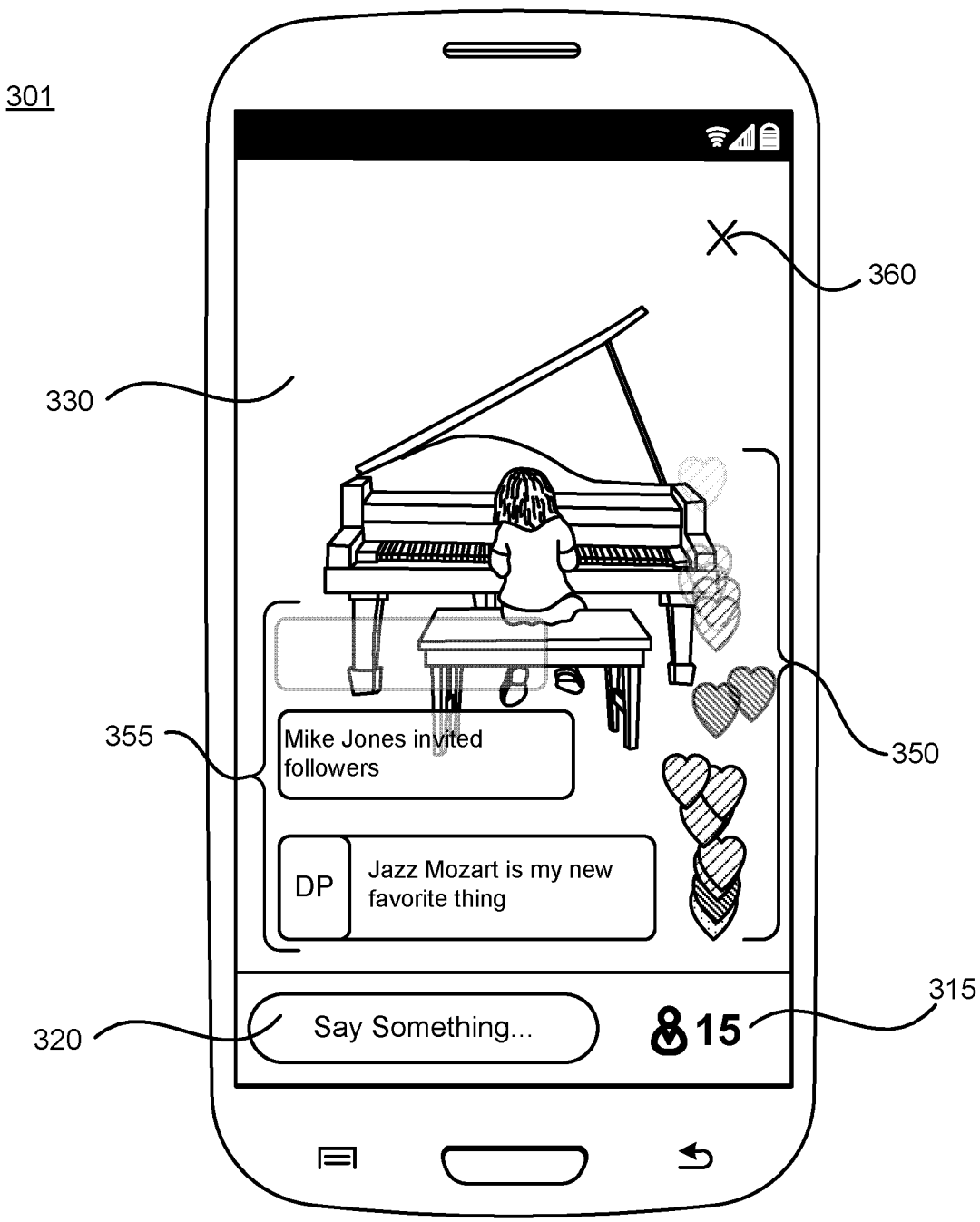
Figure 3C:
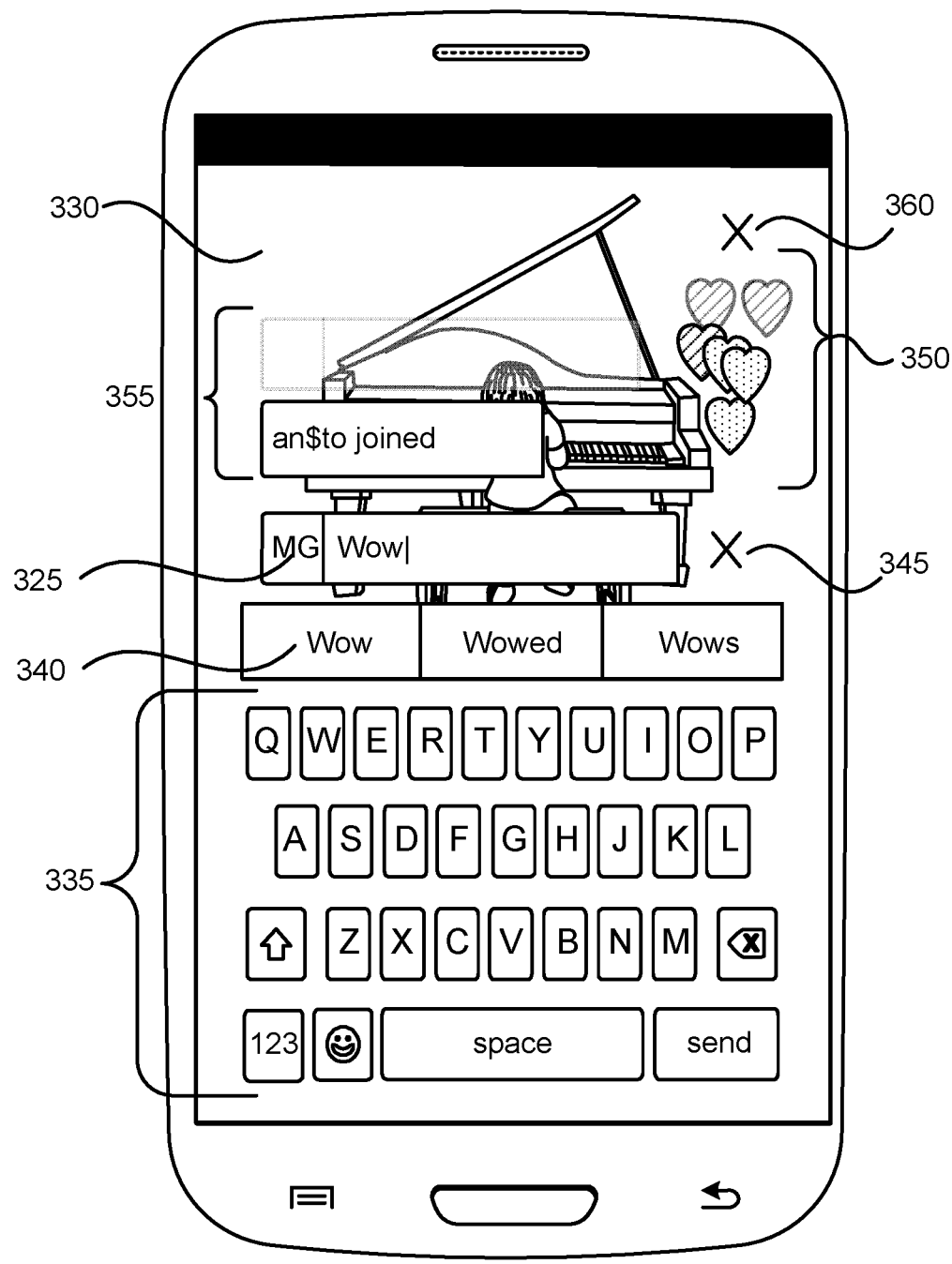

FIGS. 3A, 3B, and 3C are schematic diagrams illustrating graphical user interfaces (UIs) enabling viewers to join a live broadcast and provide engagements during the broadcast, according to an implementation. The graphical user interface of FIGS. 3A, 3B, and 3C may be generated by an interactive streaming application, such as interactive streaming application 132 of system 100 of FIG. 1. While the computing device illustrated in FIGS. 3A, 3B, and 3C is a consumer mobile computing device, it is understood that the graphical user interface may be generated for another type of consumer computing device, such as a desktop or laptop computer running a browser. FIG. 3A illustrates an example user interface 300 showing a message 305 to view a live broadcast. The message 305 may be received because a user of the computing device is directly connected to the broadcaster, Daniel Boone in this example, in a connection graph. For example, the user of the computing device may be following Daniel Boone. In some implementations, Daniel Boone may have selected the user as a private audience member for the broadcast (e.g., by selecting a user account associated with the user). The user interface 300 may also include a preview 310 of the live video stream. Selecting the view option of the message 305 may cause the device to become a viewing device and, thus, the user of the device to become a viewer.

FIG. 3B illustrates an example user interface 301 presented to a viewer of a real-time video stream. The user interface 301 may be provided, for example, after a targeted viewer joins the real-time video stream. The user interface 301 includes a viewing area 330 displaying the real-time video. In addition, the user interface 301 includes a viewer indication 315. The viewer indication 315 may display the quantity of viewers currently receiving the real-time video stream. This indication may be visible to the broadcaster as well as every viewer. The user interface 301 may also include engagement representations 350 and 355. The engagement representations 350 may represent signals of appreciation from viewers. For example, the viewer of user interface 301 may perform an appreciation gesture, which the interactive streaming application interprets as a signal of appreciation. The appreciation gesture may be a tap of the display in the viewing area 330, a click of a mouse in the viewing area 330, a predetermined key on the keyboard, a voice command, or some other gesture. The system may receive the signal of appreciation and may generate an icon 350 that corresponds with the signal. The system may also provide the signal of appreciation to the social media server, where the signal is associated with a time in the real-time video stream. The social media server may then provide an engagement indication along with the real-time video stream, so that other viewers and the broadcaster can see engagement representations 350 for the signal. In some implementations, the engagement indication may include an identifier for the viewer that provided the engagement and the engagement representation 350 may include a display element that corresponds with the viewer. For example, brown hearts may represent the viewer using the display 301, yellow hearts a second viewer, pink hearts a third viewer, green hearts a fourth viewer, etc. A viewer may provide as many signals of appreciation as desired and is not limited to providing one signal per video stream. Thus, for example, the viewer corresponding to yellow hearts has provided at least six signals of appreciation for the video-stream, each occurring at a distinct moment in time. The user interface 301 may display the icons representing signals of appreciation in an animated manner. In the example of FIG. 3B, icons 350 for recent signals of appreciation may appear at the bottom and may float upwards and fade as time passes, so that the icon is removed from the display area after a period of time. In other words, the icon may be associated with a moment in time and may disappear after a period of time elapses after the moment in time.

The user interface 301 may also include engagement representations 355, which represent engagement notifications, such as comments from other viewers, user join notices, and user share notices. The comment may include an indication of the viewer submitting the comment, for example the initials or a picture or icon associated with the viewer. The engagement notifications 355, like icons 350, may appear on the display area 330 for a fixed period of time, after which the user interface 301 removes the engagement notification 355 (e.g. by fading out or disappearing). In some implementations, the engagement notifications 355 may scroll, so that newer notifications cause older notifications to move. In the example of FIG. 3B, recently received engagements may appear at the bottom and cause older engagements to move up the display 330. The user interface 301 also includes a control 360 with which the viewer can leave the real-time video stream. The user interface 301 also includes a control 320, which enables the viewer to provide his or her own comments.

FIG. 3C illustrates an example user interface 302 for providing comments during a real-time video stream. The user interface 302 is designed for a mobile computing device with a limited screen size, so the viewing area 330 is reduced to accommodate an input device 335. However, a similar user interface 302 may not include the reduced viewing area 330, but may include the comment area 325 and optionally the suggestions 340. The comment area 325 enables the viewer to preview the comment to be submitted. The comment area 325 may also preview the viewer identifier that will be displayed with the comment after the comment is provided. User interface 302 also demonstrates that the viewer is still able to see engagement representations 350 and 355 from other users while providing a comment. In the example of FIG. 3C, one of the engagement notifications 355 is a new viewer notice. The new viewer notice provides an indication of the viewer that joined. For example, the viewer notice may include the user name of the viewer, a picture or icon for the viewer, the first and/or last name of the viewer, etc. The user interface 302 also provides a control 345 that enables the viewer to close the user interface 302 and return to user interface 301, which in some implementations may enlarge the viewing area 330 by removing the input device 335.

FIGS. 4A, 4B, 4C, and 4D are schematic diagrams illustrating graphical user interfaces (UIs) enabling users to find a live broadcast or to find a live broadcast that has ended. Replaying a broadcast that has ended includes displaying the engagements provided during the broadcast, according to an implementation. The graphical user interface of FIGS. 4A, 4B, 4C, and 4D may be generated by an interactive streaming application, such as interactive streaming application 132 of system 100 of FIG. 1. While the computing device illustrated in FIGS. 4A, 4B, 4C, and 4D is a consumer mobile computing device, it is understood that the graphical user interface may be generated for another type of consumer computing device, such as a desktop or laptop computer running a browser.

Figure 4A:
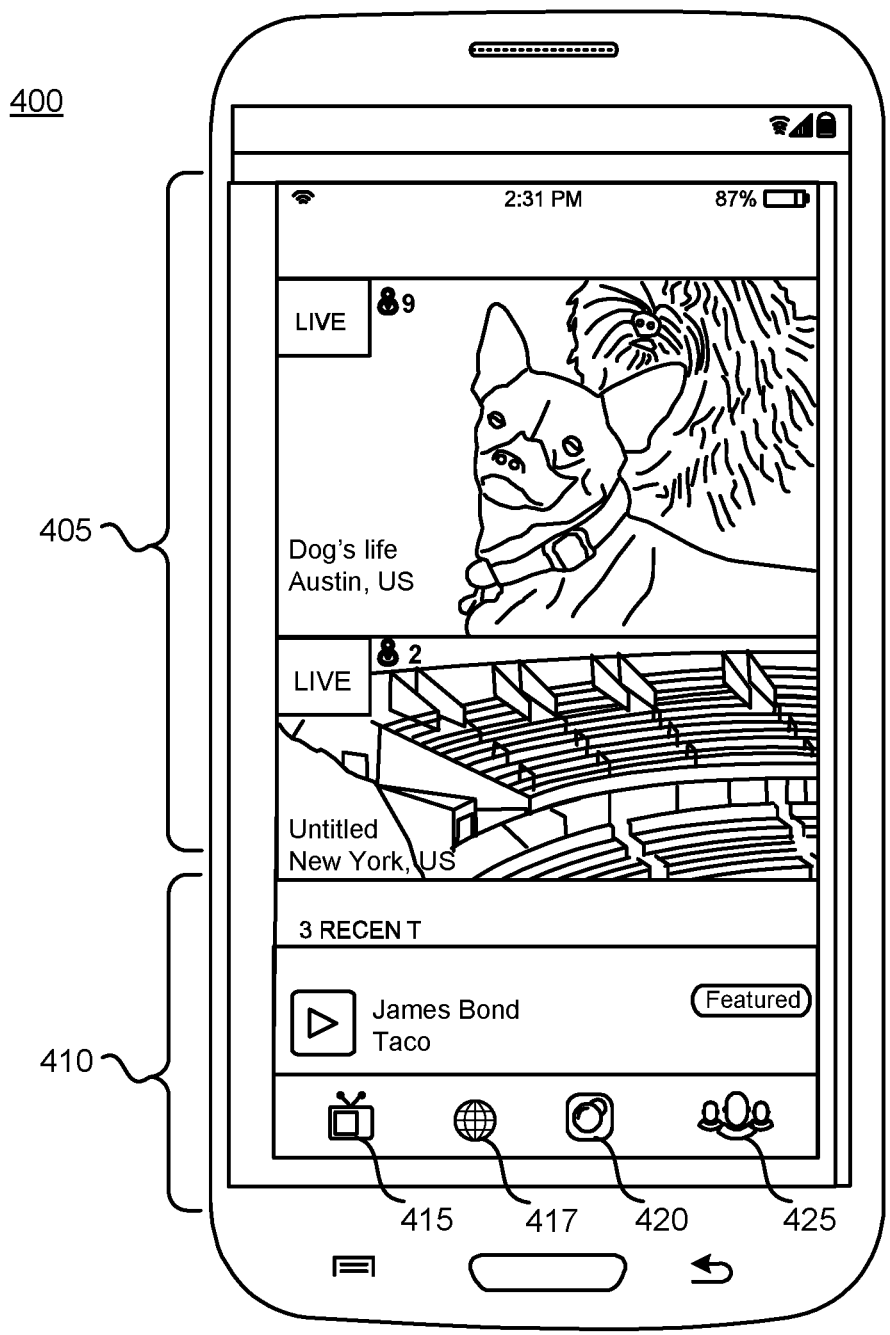
FIGS. 4A, 4B, 4C, and 4D are schematic diagrams illustrating graphical user interfaces (UIs) enabling users to replay a live broadcast that has ended, including the engagements provided during the broadcast, according to an implementation.

FIG. 4A illustrates an example menu user interface 400 for selecting video streams to view. The user interface 400 may be selected using icon 415, for example. In some implementations, the user interface 400 may be the home or default screen for the interactive streaming application. The user interface 400 may also include search icon 417. The search icon 417 may initiate a user interface for surfacing (finding) video streams, as explained with regard to FIGS. 5A and 5B. In addition to icon 415 for returning to user interface 400 and icon 417 for surfacing video streams, the user interface 400 may include icon 420, which may be used to begin a live broadcast. In other words, selecting icon 420 may trigger display of user interface 200, as described with regard to FIG. 2A. The user interface 400 may also include icon 425, which may trigger a user interface (not shown) that displays featured broadcasts and/or broadcasters. The system may select featured broadcasts and/or broadcasters based on popularity, based on a personalized recommendation (e.g., the broadcaster is followed by many user accounts the user also follows or by user accounts with a profile similar to the user or the broadcast relates to a known interest of the user), based on locality, based on correlation with social media messages, etc. Popularity of a broadcaster may be based on an aggregation of broadcast metadata (statistics) for previous video streams for the broadcaster. For example, the number of viewers per broadcast, the total number of signals of appreciation a broadcaster has received, etc.

The user interface 400 includes an area 405 showing in-progress real-time video streams and an area 410 showing saved video streams. The video streams in area 405 may be from a global list of in-progress video streams, for example at a social media server such as server 160 of FIG. 1. The server may select the in-progress video streams because the user is following the broadcaster or because the video streams relate to an interest of the user. In some implementations, the server may order the in-progress video streams based on information in a user account for the viewer using interface 400. For example, the server may order the in-progress video streams by geographic proximity to or relevance to the user. The server may also order the in-progress video streams based on popularity, which can be measured based on the number of viewers, viewer retention, quantity of signals of appreciation, average rate for signals of appreciation, average number of signals of appreciation per viewer, share rate (e.g. percent of viewers sharing the video stream), popularity of the broadcaster (e.g., measured by total signs of appreciation over all video streams for the broadcaster), correlation with a trending topic, correlation with an interest of the user, or some combination of these. In some implementations, the area 405 may be a scrollable list. In some implementations, the system may select a few live video streams for the head of the list with a large preview of the broadcast and the remainder may have thumbnail views. In some implementations, the preview may include a few seconds of video from the live video stream, e.g., a few seconds of the video that are associated with a large quantity of signals of appreciation. The previews may be selectable, so that the user can join a live video stream by selecting the preview or thumbnail in the area 405. Once a user joins a live video stream, the user may be presented with a user interface similar to that of FIG. 3B, discussed above.

Figure 4B:
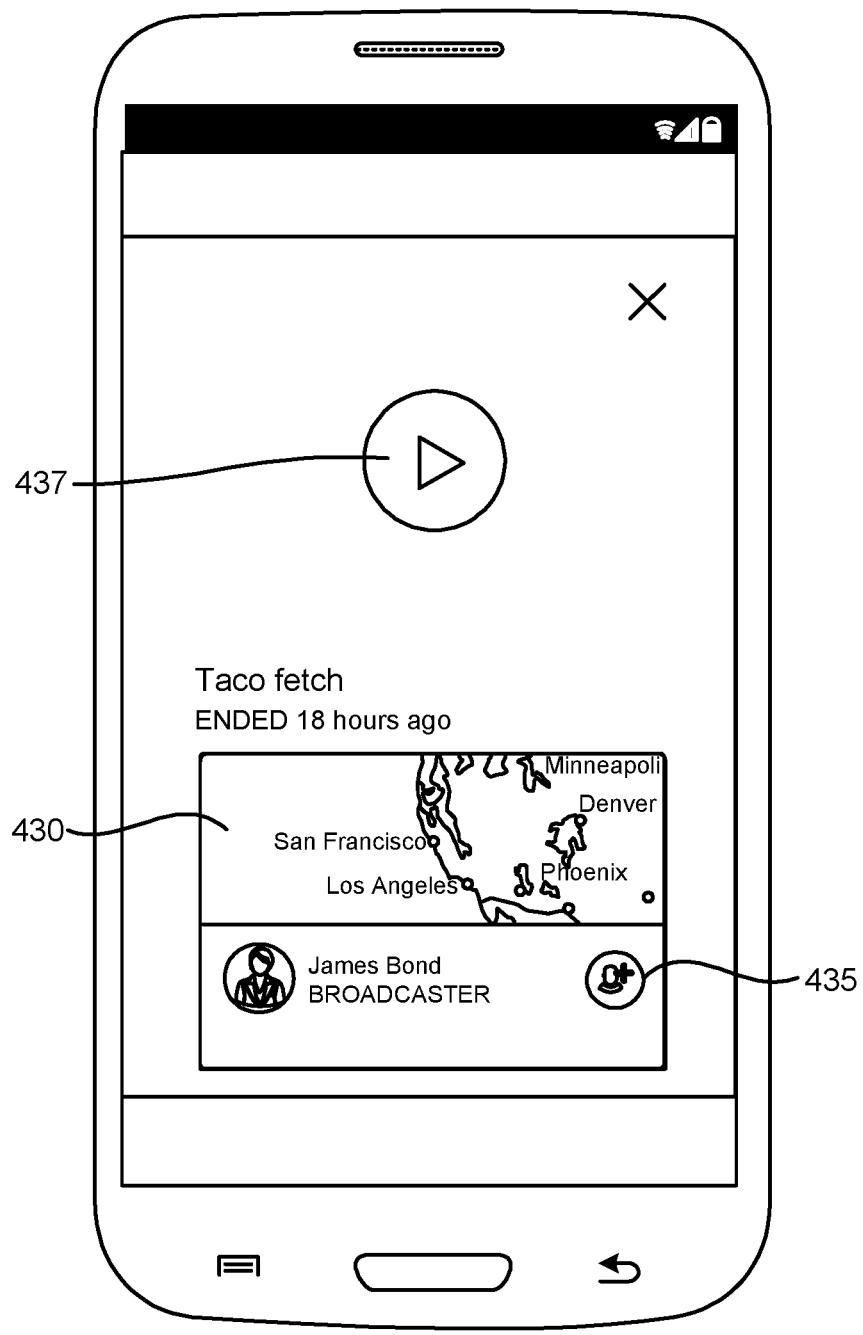

The user interface 401 may also include a list of offline stored video streams in area 410 that relate to the user, or are generally popular. When a user selects a video stream in area 410, the system may provide additional information for the recorded video stream. FIG. 4B illustrates an example user interface 401 showing additional information for a recorded video stream. The user interface 401 can include location information 430 for the location of the broadcast, biographical information about the broadcaster, how long ago the broadcast ended, and a control 435 that enables the user to follow the broadcaster, if selected. The user interface 401 can also include other broadcast metadata not illustrated, such as the total number of viewers, the total signals of appreciation the broadcast has received, etc. The user interface 401 may also include a control 437 that allows the user to begin replay of the stored video stream.

Figure 4C:
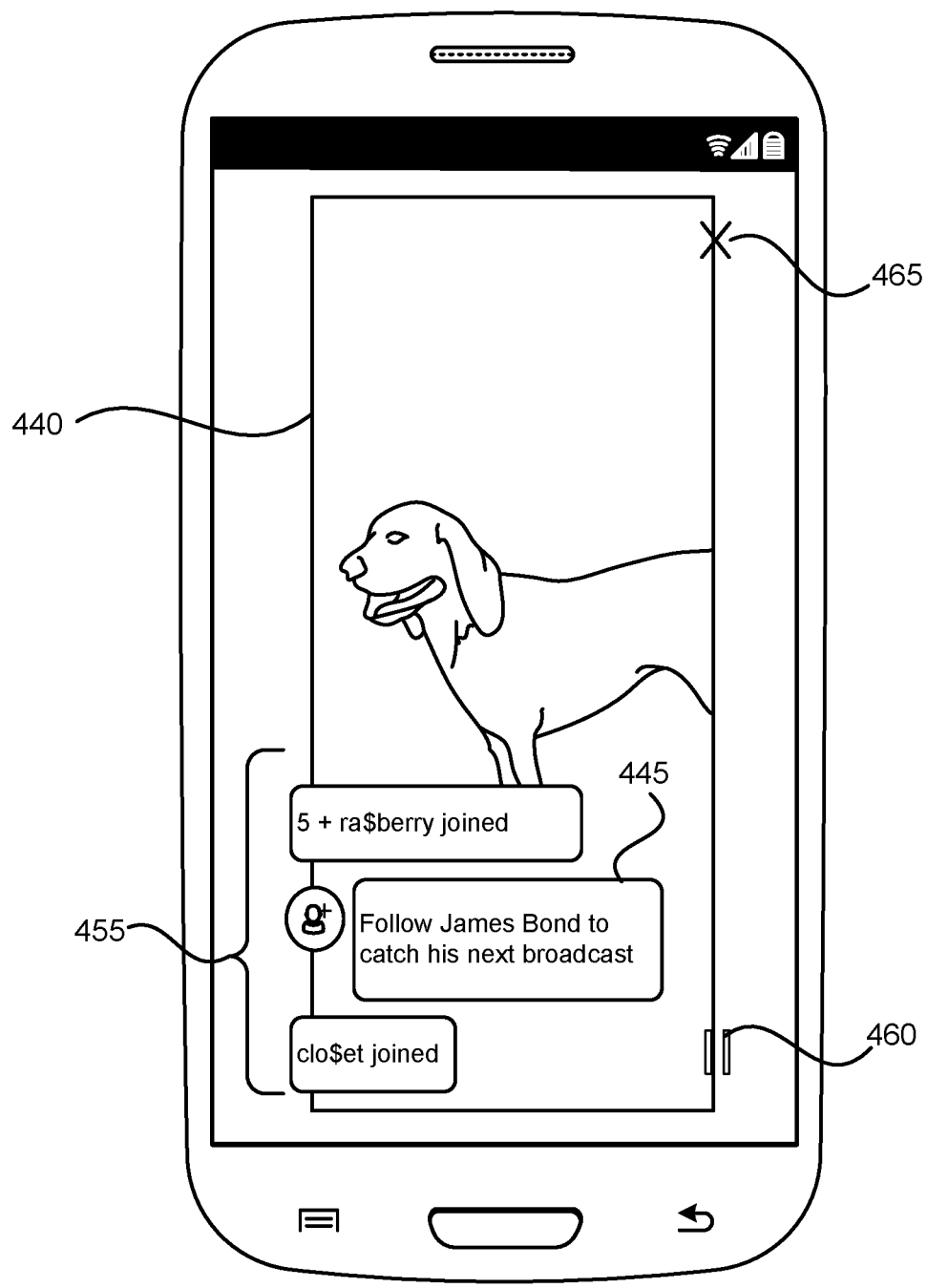
Figure 4D:
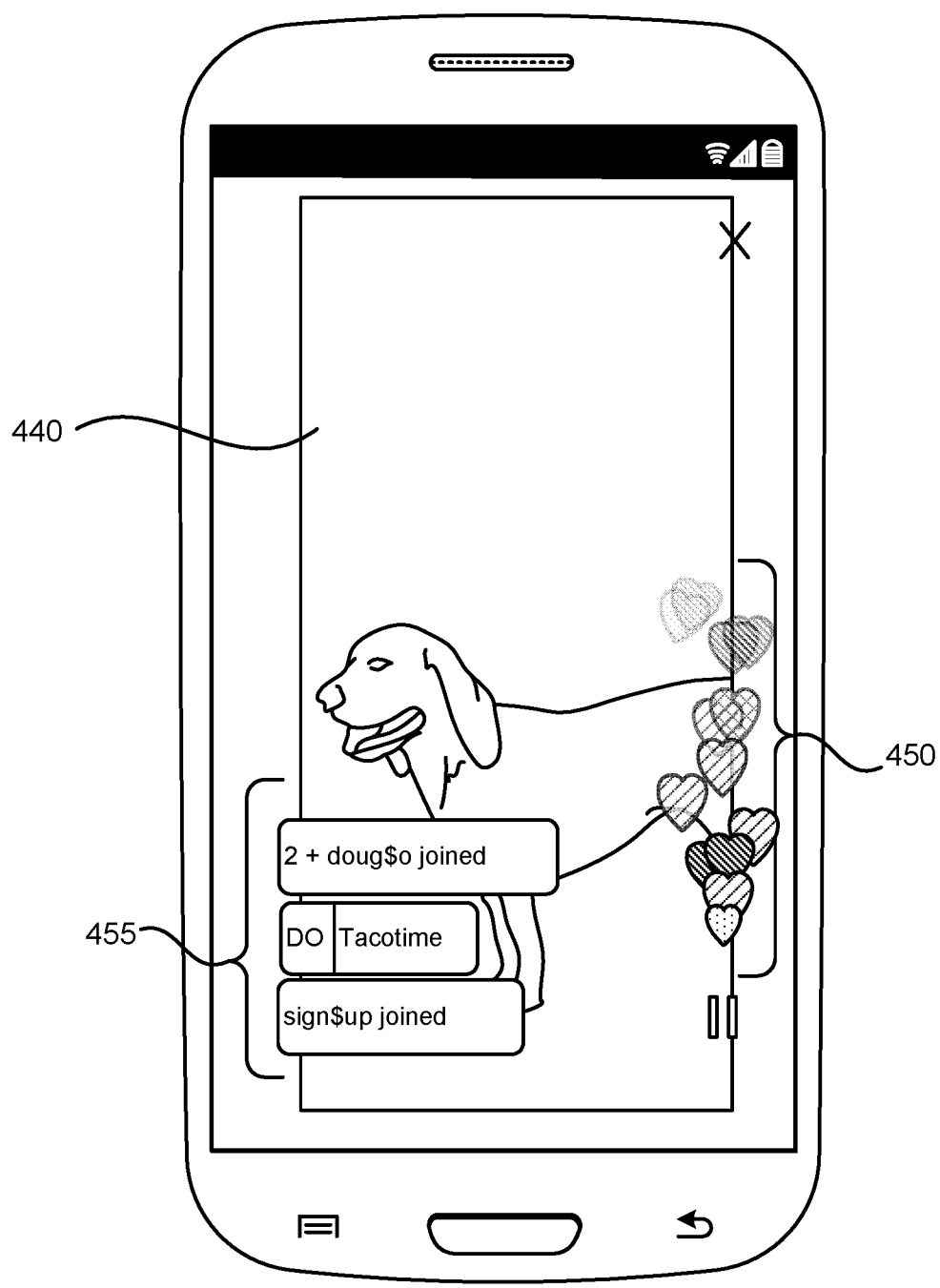

FIG. 4C illustrates an example user interface 402 for viewing a replay of a stored video stream with engagement representations. The user interface 402 may include control 465 for exiting the replay and control 460 for pausing the replay. The user interface 402 may also include a viewing area 440 where the computing device shows the video stream. The user interface 402 may also include enrichment representations 455. The enrichment representations 455 are similar to those discussed above and include comments, viewer join notifications, and viewer share notifications. The enrichment representations 255 appear in the video replay at approximately the time in the replay that they were displayed during the live video stream. Thus, a replay viewer can see the interactions between viewers just as they happened during the live broadcast. In replay mode, the system may also provide a new enrichment representation 455, which may be selectable and may allow the replay viewer to follow the broadcaster. In some implementations, during the replay the replay viewer may provide additional engagements for the video stream FIG. 4D illustrates an example user interface 403 with engagement representations added by the replay viewer. In the user interface 402, the blue heart icons may represent signals of appreciation provided by the replay viewer. In some implementations, the system may associate engagement indications with the stored video stream, so that subsequent replay viewers see the engagement representations provided by previous replay viewers. In some implementations, the signals of appreciation may be aggregated into the broadcast metadata, but may not be visible as engagement representations after the replay.

Figure 5A:
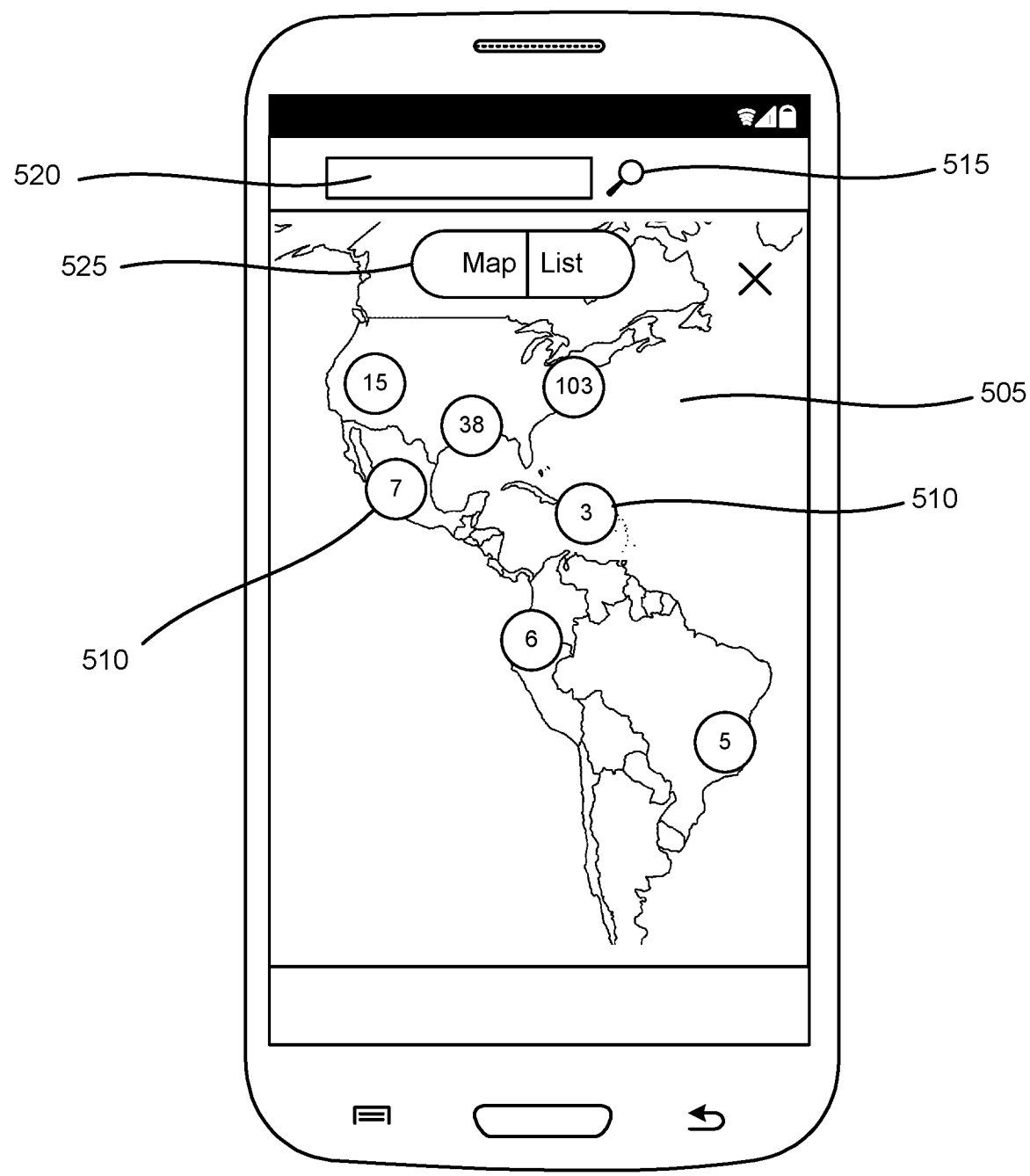
FIGS. 5A and 5B are schematic diagrams illustrating a graphical user interface (UI) enabling users to surface live broadcasts to replay or watch live, according to an implementation.
Figure 5B:
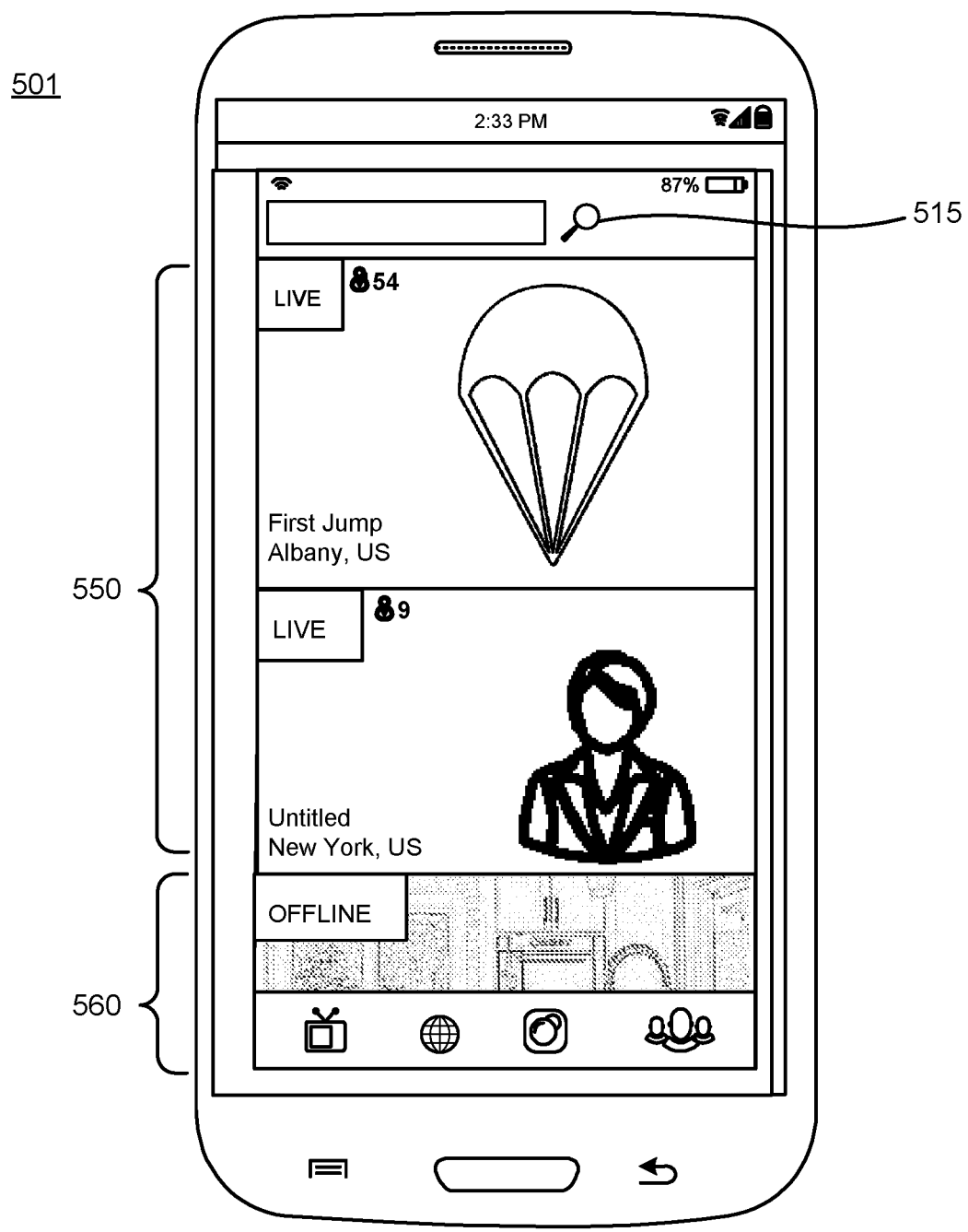

FIGS. 5A and 5B are schematic diagrams illustrating a graphical user interface (UI) enabling users to surface live broadcasts to replay or watch live, according to an implementation. In some implementations, the user interface 500 may be a map 505 that provides indications 510 of the location of video streams. The indications 510 may be placed proximate a location on the map that corresponds to the location of a video stream. The indications 510 may include a number representing the number of video streams with locations in the vicinity of the indication. Thus, the indication 510 that includes the number 103 may indicate that there are 103 video streams in locations on the east coast of the United States. The video streams may be live but can also include stored video streams. In some implementations, the user interface 500 may include an indication with a different appearance, e.g., a different color or shape, for stored video streams.

A user may pan the map to see different locations, or may zoom in or zoom out of the map. When the user zooms in, the user interface 500 may reorient the map and break down the video streams associated with the zoomed area. In other words, if the user zooms in on the east coast of the united states, the user interface 500 may display the states in on the east coast and provide indications 510 that break the 103 broadcasts into more indications so that, for example, the user could see that 25 of the 103 broadcasts are in the New York area, 17 are in the Washington D.C. area, etc. If a user selects an indication 510 the user interface may switch to a list view, as illustrated in FIG. 5B, that provides details on the video streams represented by the number. Put another way, if the user selects the indication 510 with 3 video streams in FIG. 5A, the system may switch it a list view (FIG. 5B) that lists the details of the 3 video streams. The user interface may also include a control 525 to allow the user to manually switch to the list view.

In some implementations, the user interface 500 may include a search control 515 that initiates a query entered by the user in text input 520 to search for a particular broadcaster, a particular location, or a particular broadcast that has a title or content from comments that is responsive to the query. When the user enters a query in text input 520 and submits the query via control 515, the client device may provide the query to the server and the server may provide a list of matching broadcasts. The broadcasts may match based on words or topics in the title, in the comments, in the location name, or in a broadcaster name. In response to a query, the client device may switch to a list user interface 501, as illustrated in FIG. 5B.

As illustrated in FIG. 5B, area 550 of user interface 501 may include an active or in-progress real-time video stream area 550 and a stored or offline video stream area 560. In some implementations, the video streams that are responsive to a query may be listed in areas 550 and 560. The query may be a text query or a location query. In some implementations, the user may navigate to user interface 501 without a query, e.g., by using control 525 of FIG. 5A. In such an instance, the system may populate the list of video streams based on relevance to the user or on popularity, or a combination of these. Relevance to the user may be based on proximity to the user's location, relating to known interests of the user, who the user is following in the connection graph, who connections of the user are following in the connection graph, etc. Video streams related to the user may appear in a position of prominence (higher in) the list of video streams. Likewise, popular video streams may be determined by the number of viewers, the correlation of a topic of the video stream with a trending topic, the number of video streams occurring in close proximity to a video stream (indicating likelihood of an event of importance), popularity of the broadcaster, etc.

The entries for the live video streams in area 550 and saved video streams in area 560 may be selectable. For example, if the user selects a video stream from area 550, the system may initiate the user interface for joining a video stream, e.g., illustrated in FIG. 3B. Similarly, if the user selects a video stream from area 560, the system may initiate the user interface for viewing a saved video stream, e.g., illustrated in FIG. 4B. In some implementations, the system may select a few live video streams for the head of the list with a large preview of the broadcast and the remainder may have thumbnail views. In some implementations, the preview may include a few seconds of video from the live video stream, e.g., a few seconds of the video that are associated with a large quantity of signals of appreciation. The previews may be selectable, so that the user can join a live video stream by selecting the preview or thumbnail in the area 550.

Figure 6:
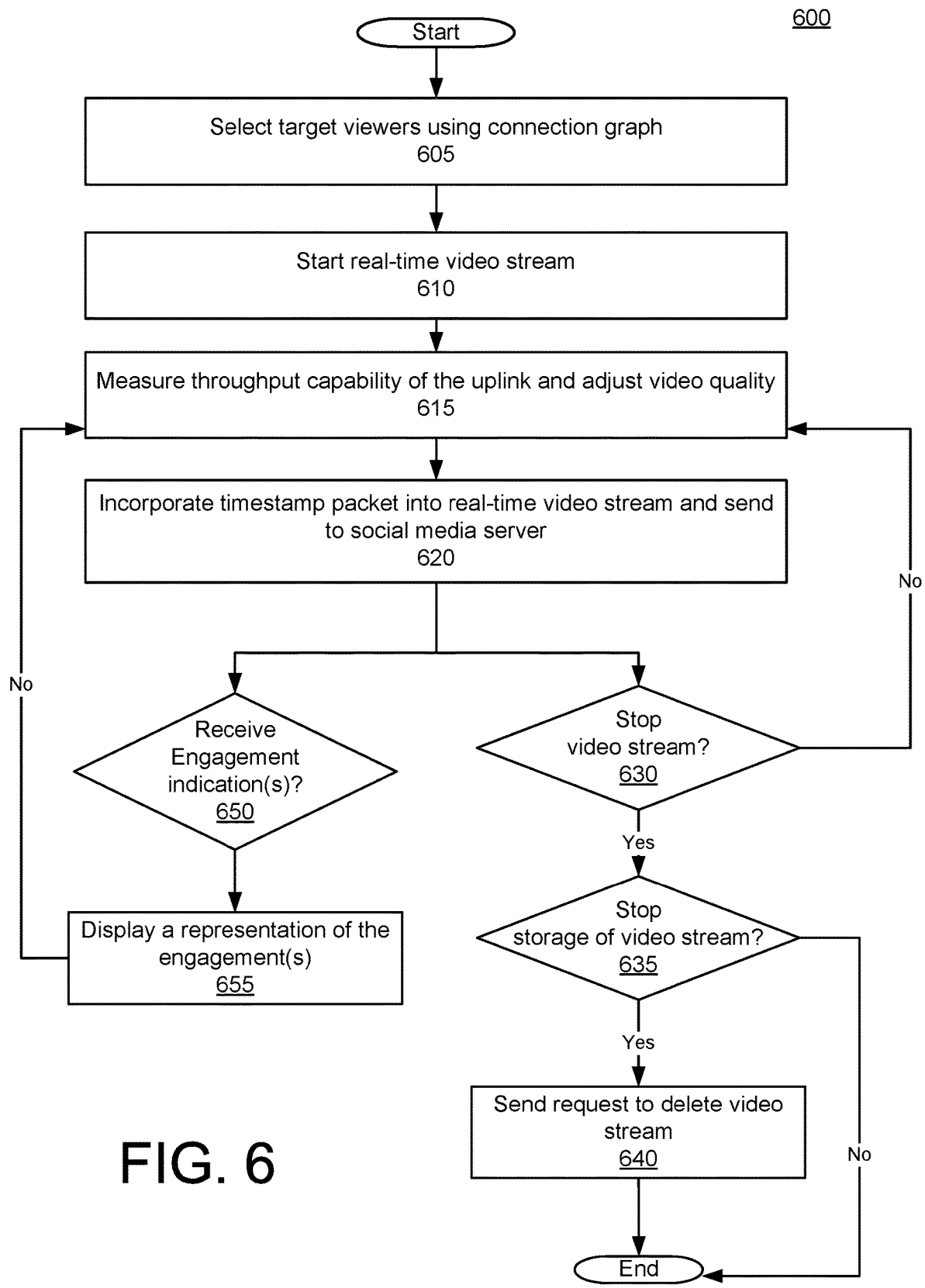
FIG. 6 is a flow chart illustrating a method of broadcasting an interactive live broadcast, according to an implementation.

FIG. 6 is a flow chart illustrating a process 600 for broadcasting an interactive live broadcast via a social media platform, according to an implementation. The process 600 may be executed by a consumer computing system running an interactive streaming application, such as application 132 of FIG. 1. The process 600 may enable a broadcaster to broadcast a real-time video stream to multiple viewers using a standard camera integrated with the consumer computing device. Thus, for example, a broadcaster can use a smartphone or smart glasses to broadcast the video stream to followers in the social media platform. In addition, process 600 enables the broadcaster to receive and view feedback, in the form of engagements, during the broadcast.

Process 600 begins with the broadcaster selecting targeted viewers (605). The broadcaster may use a connection graph to identify targeted users. The connection graph may be a local (e.g., local to the consumer device) connection graph or a connection graph stored at the social media server. For example, the broadcaster may be logged into the social media server and, based on that connection, the consumer computing device may access the connection graph. Selecting target viewers may include selecting a privacy setting for the broadcast. For example, the broadcaster may indicate the broadcast will be public. In a public broadcast, anyone may join as a viewer, but the target viewers may be those directly connected (e.g., following) the broadcaster in the connection graph. In a private broadcast, anyone following the broadcaster in the connection graph may be a target viewer, or the system may allow the broadcaster to select a subset of followers to be target viewers.

The system may begin a real-time video stream (610) and measure the throughput of the connection between the consumer computing device and the social media server (615). The throughput of the connection, or in other words the upload bandwidth, may be dependent upon several factors, such as network speed and traffic, interference, etc. If the throughput is low (i.e., the bandwidth is low), the system may reduce the video quality. This enables the system to send less video data when the bandwidth is low and send more when the bandwidth is higher. This technique of constantly monitoring the throughput and adjusting the broadcast video quality to match the bandwidth (lower quality for lower bandwidth and higher quality for higher bandwidth) enables the system to keep the latency at around 2 seconds. Latency represents the time between when an image is captured and when it is displayed on a viewer's screen. A longer latency would make engagements provided to the broadcaster and other viewers stale. In other words, with a latency of more than a few seconds the engagements provided by users would be associated with a moment in time that has passed and is no longer relevant to what is currently displayed. Thus, it is understood that the system performs step 615 at regular intervals throughout the live broadcast (process 600) to ensure that buffering and latency are minimized.

The system also incorporates a timestamp packet into the real-time video stream and sends the video stream to the social media server (620). The timestamp packet may be a Network Time Protocol (NTP) code associated with each frame. This timestamp packet provides a mechanism to associate one or more engagements with the moment in time in the video stream. The video stream is provided on a continuous basis until the broadcaster decides to stop the video stream (630, Yes). As the video stream is provided to the social media server, the device may receive engagement indications (650) from the social media server. The engagement indications represent comments, signals of appreciation, viewer joining notifications, and viewer share notifications. In some implementations, the appearance of the engagement may differ depending on the viewer providing the engagement. The engagements may be provided from the social media server to the broadcaster via a data stream. The device may display representations of the engagement indications with the preview of the video stream (655). For example, each engagement may be associated with a moment in time and may be displayed for a period of time subsequent to the moment in time. User interface 202 of FIG. 2C provides an example of the device displaying representations of the engagement indications at the broadcaster's device.

When the system receives a command to stop the video stream (630, Yes), the system may stop the real-time video-stream. In some implementations, the video stream may be stored locally on the system as a movie file. The system may also determine whether the broadcaster wants to store the video stream at the server or not (635). In some implementations, storing the video stream may occur unless the broadcaster provides an indication not to store the video stream for replay. Thus, if the broadcaster provides an indication not to store the video (635, Yes), the system may send a request to delete the video stream from the server (640). In some implementations, the video stream will only be stored for replay when the broadcaster affirmatively requests such storage. In such implementations, the system may send a request to the server to keep the video stream for replay. In some implementations, the system may provide a display of metadata for the stopped video stream. Process 600 then ends.

Figure 7:
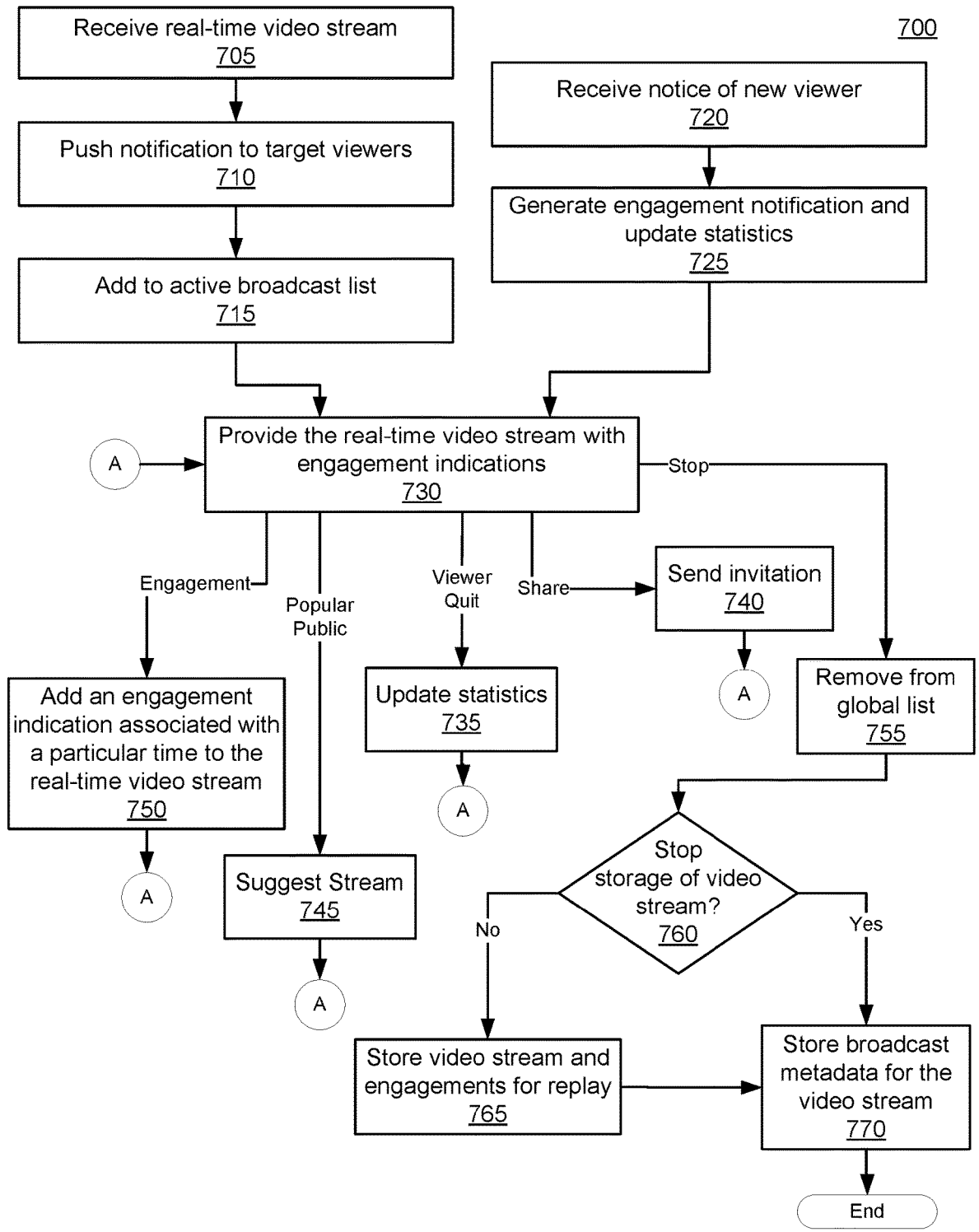
FIG. 7 is a flow chart illustrating a method of providing an interactive live broadcast, according to an implementation.

FIG. 7 is a flow chart illustrating a process 700 of providing an interactive live broadcast, according to an implementation. Process 700 may be executed by a social media system, for example server 160 of FIG. 1. Process 700 may take a live video stream provided by a consumer computing device operated by an account holder in the social media system and may make the live video stream available to other account holders in the social media system. Process 700 may also enable viewers to share the video with others (when allowed by the broadcaster) and to interact with the broadcasting account hold and other viewers (i.e., viewing account holders). While process 700 illustrates one live video stream, it is understood that the social media system may be configured to handle hundreds or thousands of such live video streams at a time.

Process 700 begins with receipt of a real-time video stream broadcast request from a broadcaster (705). The broadcaster may be a user in the social media system. The broadcast request may include the video stream and a privacy indication, which the system may use to determine target viewers. Target viewers are entities in a connection graph for the social media system who are following the broadcaster. If the privacy indicator indicates the broadcast is private, the target viewers may be a subset of the followers. The system may push a notification to the target viewers (710). The notification lets the target viewer know that a broadcaster the target viewer is following has started a broadcast and provides the target viewer with an opportunity to join the real-time video stream. In addition, the system may add the broadcast to an active broadcast list (715). The system may use the active broadcast list to show currently active broadcasts to account holders of the social media system. For example, if the broadcast is public, only followers may receive the push notification, but anyone may see the active broadcast in a user interface displaying live video streams from the active list, such as interface 400 of FIG. 4 or 501 of FIG. 5B. This gives other users the opportunity to join the broadcast and determine if they may want to follow the broadcaster. The system may then begin providing the real-time video stream (730). In some implementations, this may include converting the video stream into a variety of different formats (e.g., each format appropriate for a different consumer computing device). Providing the real-time video stream may also include selecting a format appropriate for a particular viewing device and providing engagement indications that accompany the video stream. The system may provide the engagements via a data stream. The engagements in the data stream may be associated with a moment in time, e.g., the NTP code associated with a frame in the video stream. The data stream can be used to generate engagement representations. The engagement indications may be provided to the broadcasting device as well, e.g., via the data stream. The appearance of the engagements may be determined by the server, e.g., the interactive video sharing engine 170. In some implementations, the appearance may be selected based on a theme determined by the date of the live video stream or a topic for the live video stream. In some implementations, the appearance of signals of appreciation may be different for different viewers, e.g., so that one view has a different fill color or pattern than another viewer. This enables the broadcaster and others to see that different viewers are providing engagements. The quality of the video provided to the client viewing devices is determined by the broadcasting device to keep latency low so that display of the engagements is timely.

When a viewer joins the broadcast, the system receives a notification that a new viewer has joined (720). The new viewer may have responded to a push notification (e.g., sent as part of step 710), or may have responded to an invitation from another viewer (e.g., sent as part of step 740). In response to a new viewer joining, the system may generate a new viewer notification, which is a type of engagement indication (725). The system may then begin providing the real-time video stream and engagement indications to the new viewer. The system provides the real-time video stream on an ongoing basis until the broadcasting device stops the real-time video stream. Therefore, while the system provides the real-time video stream, it may also be performing other tasks. For example, the system may receive an engagement from one or more of the viewers. In response, the system may add an engagement indication and associate the engagement indication with a particular time in the video stream (750). Associating the indication with a time enables the displaying device to determine how long to display a representation of the engagement and, during replay, when to begin displaying the representation of the engagement. The system may also update broadcast metadata based on the engagement (e.g., updating the number of signals of appreciation, number of comments, etc.). When the system receives an indication that a viewer has quit, the system may update broadcast metadata (735). For example, the system may update how long the viewer watched the broadcast, may update the number of viewers currently watching the broadcast etc. In some implementations, the system may also generate an engagement indication that can be used to notify other viewers that the viewer left the broadcast.

One of the viewers may also share the real-time video stream. Sharing may occur for public broadcasts and can occur with broadcaster permission in a private broadcast. When sharing occurs, the system may send a push notification to followers of the viewer who initiated the share (740). In other words, user accounts in the connection graph that are following the viewer who shared the video stream may receive a push notification or other message that includes an invitation to join the broadcast. In some implementations, sharing may be accomplished using a different social media platform. For example, the video stream may be broadcast via a first social media platform. A viewer or the broadcaster may have a user account in a second social media platform as well. The viewer or broadcaster may notify others about the broadcast via the second social media platform. For example, the notification may include a message with a link or other control that allows the recipient to open the interactive streaming application and join the video stream. As another example, the notification may include a message with a description of the video stream and, optionally, some statistics about the video stream (e.g., number of viewers and/or signals of appreciation) and a link to download the interactive streaming application. As another example, sharing the video stream may include a post with a container that plays the video stream. The video stream shared in such a post may or may not show engagement representations. The viewer of such a post is not able to provide engagements of their own without joining the broadcast.

When a real-time video stream becomes sufficiently popular, the system may suggest the real-time video stream to additional target viewers (745). For example, the stream may receive a position of prominence in a list of active broadcasts. As another example, some user accounts may elect to receive notifications of popular video streams and the system may notify these user accounts of the video stream once the video stream reaches the qualifications for popularity. Qualifications for popularity may include having a threshold quantity of viewers join in a given time period, having a threshold quantity of signals of appreciation during a given time period, having a threshold quantity of broadcasts in proximity to a particular location, having comments that include topical content (e.g., content that includes a trending hashtag), having a location that corresponds with a spike in messages sent from that same location, etc.

When the broadcaster ends the video stream the system may remove the broadcast from the global list (755). If the video stream is to be stored for replay (760, No), the system may store the video stream and engagement indications (765). The system may store the video streams and engagements for a limited time. The system may also store broadcast metadata (770) for the broadcast regardless of whether the video stream is saved. This metadata may be used to identify popular or well-liked broadcasters or to suggest video streams for replay. Process 700 then ends for this broadcast.

Figure 8:
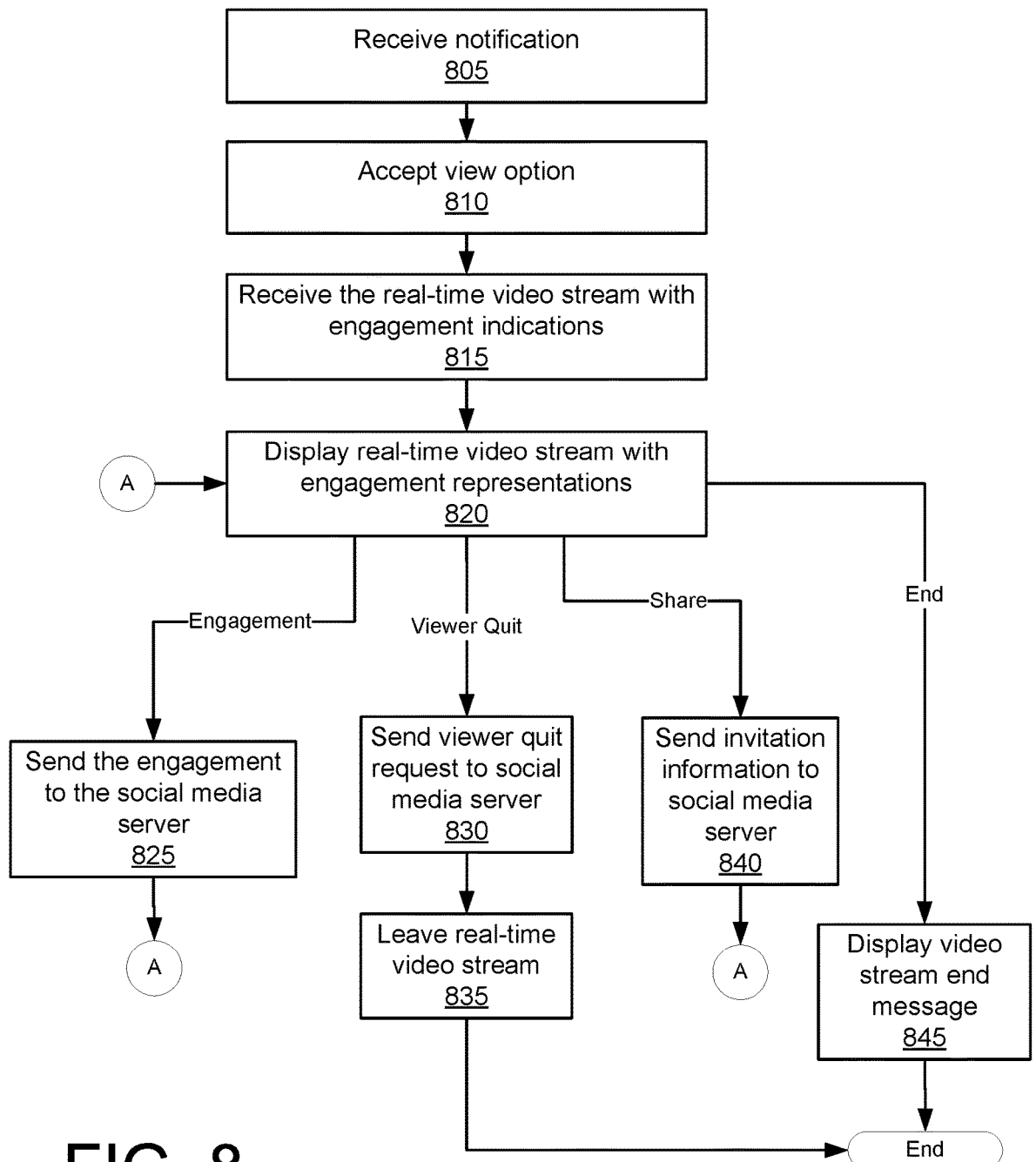
FIG. 8 is a flow chart illustrating a method of viewing an interactive live broadcast, according to an implementation.

FIG. 8 is a flow chart illustrating a process 800 of viewing an interactive live broadcast, according to an implementation. Process 800 may be executed by a consumer computing system, for example device 102 of FIG. 1. Process 800 may receive a video stream provided via a social media platform and engagement indications and provide a user interface that combines representations for the engagement indications with the video stream, and enables the viewer to provide engagements.

Process 800 begins with receipt of a notification about a real-time video stream (805). The notification may be a push notification. In some implementations the notification may be another type of message with a link or control that directs the system to the viewing interface. Interface 300 of FIG. 3A illustrates such an example notification. The system may receive an acceptance to view the video stream (810) and may open an interface for viewing and interacting with the video stream. Interface 301 is an example of the interface the system may provide after the acceptance. The system may then receive the real-time video stream with engagement indications from the social media server (815) and display the real-time video stream with engagement representations (820). While the system displays the real-time video stream, the viewer may take a number of actions. For example, the user may send an engagement, such as a signal of appreciation or a comment. When the system receives the engagement, the system may provide the engagement to the social media server (825). Part of the information provided may be a time stamp from a timestamp packet associated with a frame of the video stream that is displayed when the engagement is received. As another example, the user may share the video stream. In some implementations, whether a viewer can share a video stream may be determined by the privacy settings selected by the broadcaster. For example, a private broadcast may not be shared while a public broadcast may be shared. When the system receives a request to share, the system may notify the social media server about the request (840). The social media server may invite other users as discussed above with regard to FIG. 7. The viewer may also decide to leave the real-time video stream and the system may send a quit request to the social media server (830) and allow the viewer to exit the user interface displaying the stream (835). The broadcaster may also choose to end the real-time video stream. At the end of the broadcast, the system may trigger display of a notification to the viewer that the stream has ended (845).

Figure 9:
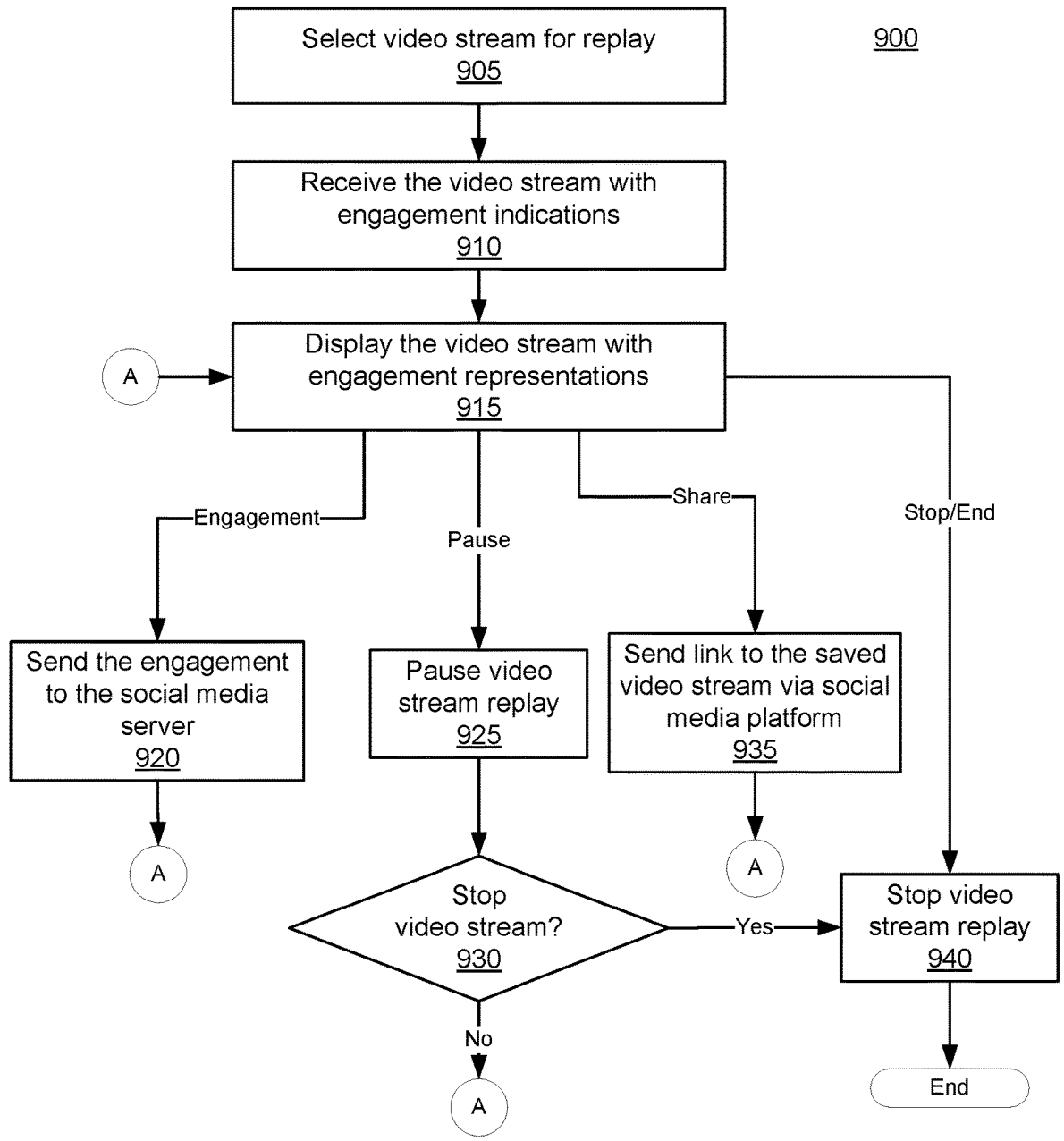
FIG. 9 is a flow chart illustrating a method of replaying an interactive live broadcast, according to an implementation.

FIG. 9 is a flow chart illustrating a process 900 of replaying an interactive live broadcast, according to an implementation. Process 900 may be executed by a consumer computing system, for example device 102 of FIG. 1. Process 900 may replay a video stream generated as user content and provided via a social media platform as well as provide interactions in the form of engagement representations that occurred during the original broadcast of the video stream. Process 900 may also enable the replay viewer to add engagements.

Process 900 begins with selection of a stored video stream for replay (905). In some implementations, the system may provide a list of suggested stored video streams. The suggestions may be based on popularity or similarity with a profile of the replay viewer. The system may then receive the stored video stream with engagement indications from the social media server (910) and display the stored video stream with engagement representations (915). While the system displays the stored video stream, the viewer may take a number of actions. For example, the user may send an engagement, such as a signal of appreciation. When the system receives the engagement, the system may provide the engagement to the social media server (920). In some implementations, the social media server may aggregate the signal of appreciation into the broadcast metadata. In some implementations, the system may provide an engagement representation for the signal of appreciation.

As another example, the user may share the saved video stream. When the system receives a request to share, the system may send a message about the saved video stream via a social media platform (935). This may include sending a message with a link or sending a message that includes the stored video stream. In some implementations the system may send a push notification that would, if accepted, open a user interface used to replay the stored video stream. User interface 401 of FIG. 4B is an example of such a user interface. The replay viewer may also choose to pause the video stream (925) and stop the video stream (940).

Figure 10:
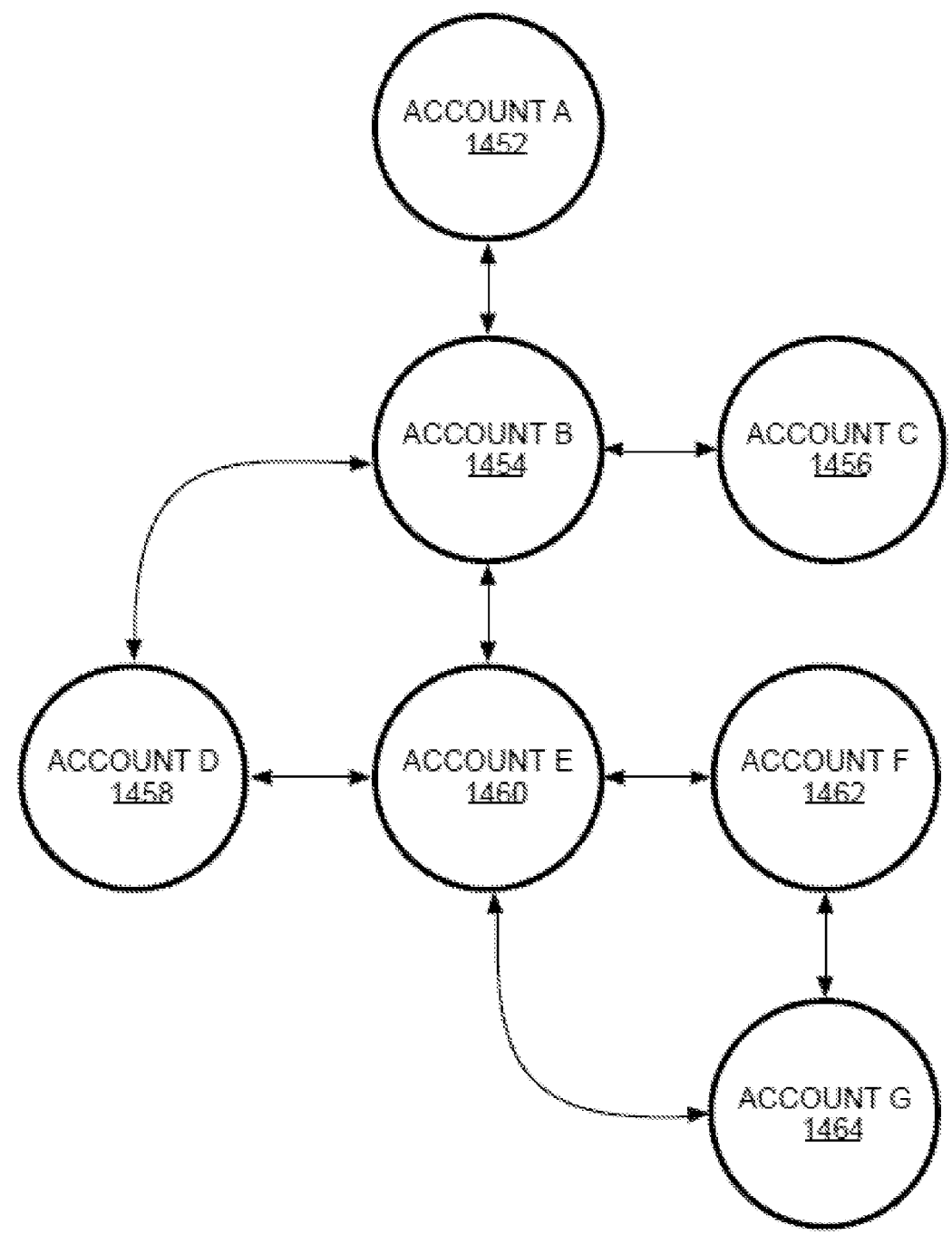
FIG. 10 is an example depiction of a connection graph, according to an implementation.

FIG. 10 shows an example depiction of a connection graph 1450 in accordance with one or more implementations of the invention. In one or more implementations, the connection graph 1450 is a depiction of connection graph 168 of FIG. 1, or connection graph 142 of FIG. 1. As shown in FIG. 10, the connection graph 1450 includes multiple components including nodes representing accounts of in a social media platform (i.e., Account A 1452, Account B 1454, Account C 1456, Account D 1458, Account E 1460, Account F 1462, and Account G 1464) and edges connecting the various nodes.

The connection graph 1450 is a data structure representing relationships (i.e., connections) between one or more accounts. The connection graph 1450 represents social media accounts as nodes and relationships as edges connecting one or more nodes. A relationship may refer to any association between the accounts (e.g., following, friending, subscribing, tracking, liking, tagging, and/or etc.). In some implementations, a relationship can be inferred. The edges of the connection graph 1450 may be directed and/or undirected based on the type of relationship (e.g., bidirectional, unidirectional), in accordance with various implementations of the invention.

Many social media platforms include functionality to broadcast streams of messages to one or more accounts based at least partially on a connection graph representing relationships between those accounts (see FIG. 10). A stream may be a grouping of messages associated with one or more accounts or can reflect any arbitrary organization of messages that is advantageous for the user of an account. In accordance with various implementations of the invention, a "message" is a container for content broadcasted/posted by or engaged by an account of a messaging platform. Messages can be authored by users and can include any number of content types (multimedia, text, photos, and video content, including a single video content file that includes a plurality of different video content segments, etc.).

Figure 11:
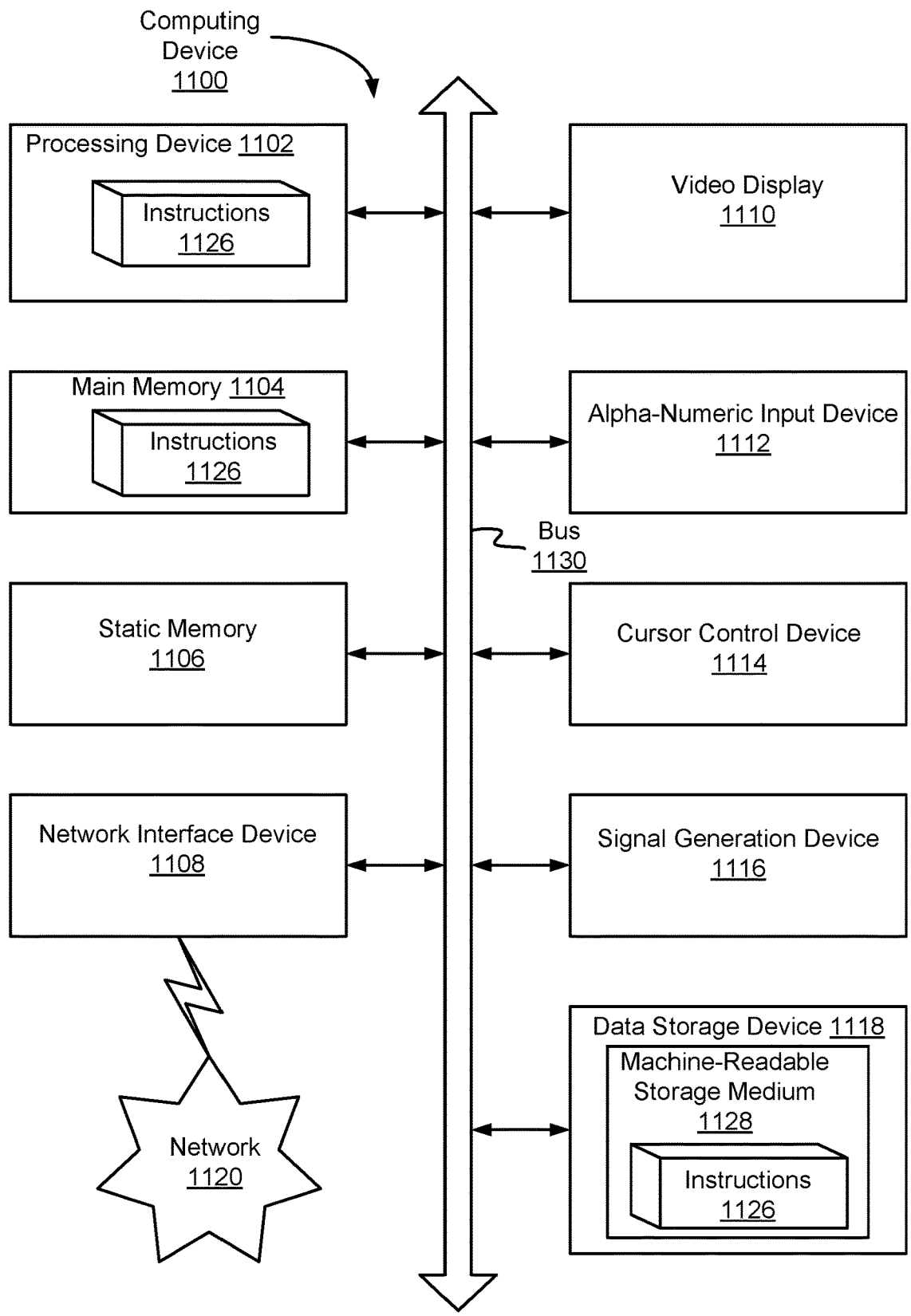
FIG. 11 shows an example of a computer device and a mobile computer device that can be used to implement the techniques described here.

FIG. 11 illustrates a diagrammatic representation of a machine in the example form of a computing device 1100 within which a set of instructions, for causing the machine to perform any one or more of the methodologies discussed herein, may be executed. The computing device 1100 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the computing device 1100 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 1100 includes a processing device (e.g., a processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)) and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1126 (e.g., instructions for an application ranking system) for performing the operations and steps discussed herein.

The computing device 1100 may further include a network interface device 1108 which may communicate with a network 1120. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse) and a signal generation device 1116 (e.g., a speaker). In one implementation, the video display unit 1110, the alphanumeric input device 1112, and the cursor control device 1114 may be combined into a single component or device (e.g., an LCD touch screen).

The data storage device 1118 may include a computer-readable storage medium 1128 on which is stored one or more sets of instructions 1126 (e.g., instructions for the application ranking system) embodying any one or more of the methodologies or functions described herein. The instructions 1126 may also reside, completely or at least partially, within the main memory 1104 and/or within the processing device 1102 during execution thereof by the computing device 1100, the main memory 1104 and the processing device 1102 also constituting computer-readable media. The instructions may further be transmitted or received over a network 1120 via the network interface device 1108.

While the computer-readable storage medium 1128 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

According to one aspect, a method includes providing a live feed broadcast from a source mobile device to a plurality of viewing devices, receiving, during the live feed broadcast, an engagement from one of the plurality of viewing devices, and associating the engagement with a particular time in the live feed broadcast. The method also includes providing an indication of the engagement to the source mobile device, wherein the source mobile device displays a graphic representation of the engagement during the live feed broadcast and adding the indication of the engagement to the live feed so that a graphic representation is displayed during the live feed or during subsequent playback of the live feed at the particular time to users of the plurality of viewing devices.

These and other aspects can include one or more of the following features. For example, the method may also include receiving a plurality of engagements from the one viewing device, generating a new indication for each of the plurality of engagements, associating each of the plurality of engagements with a respective time, where the respective times are distinct but may overlap, and adding the new indications to the live feed so that a plurality of graphic representations are displayed during the live feed or during subsequent playback of the live feed at the respective times to the users of the plurality of viewing devices. As another example, the engagement may be a first engagement, the particular time may be a first time, and the indication may be a first indication, and the method further includes receiving a second engagement from a second viewing device of the plurality of viewing devices, generating a second indication for the second engagement, associating the second indication with a second time, where the first time and the second time are distinct, and adding the first indication and the second indication to the live feed so that the first indication is visible and the second indication is visible in the live feed to the users of the plurality of viewing devices. As another example, the users of the plurality of viewing devices may each have a graph relationship with a user of the source mobile device in a social media platform and the users of the plurality of viewing devices and the user of the source mobile device are users in the social media platform. As another example, the users of the plurality of viewing devices may each have a graph relationship with a user of the source mobile device in a social media platform and the users of the plurality of viewing devices view the live feed during concurrent sessions of the social media platform.

As another example, the engagement may be a signal of approval. As another example, the engagement may be a comment and the indication may be a representation of the comment. In some such implementations, the representation of the comment includes an indication of a user of the one of the plurality of viewing devices who submitted the comment. As another example, the method may also include storing the live feed with the indication associated with the particular time added as a stored video for a period of time, and providing the stored video for replay in response to a request, from a replay device, to replay the stored video, wherein the indication triggers appearance of a graphic representation at the particular time during the replay on the replay device.

According to one aspect, a system includes at least one processor, a display device, and memory storing instructions that, when executed by the at least one processor, generate a user interface. The user interface may be configured to receive an acceptance of a notification regarding a live broadcast, display the live broadcast on the display device, initiate display a plurality of icons with the live broadcast, each icon representing an signal of appreciation from one of a plurality of viewers of the live broadcast and the icon being associated with a respective time in the live broadcast. The user interface may also be configured to initiate removal of icons from the display device a predetermined interval elapses after respective times, trigger display, on the display device, a plurality of notifications with the live broadcast, each notification being associated with a respective time, and initiate removal of notifications from the display based on respective times.

These and other aspects can include one or more of the following features. For example, the system may further comprises an input device, and the live broadcast may be provided from a server. In such implementations, the user interface can further be configured to receive a signal of approval via the input device and provide the signal to the server, wherein the server associates the signal of approval with a respective time in the live broadcast, adds an indication in the live broadcast for the signal at the respective time, and provides the indication with the live broadcast to the server. As another example, the plurality of icons may be from a same viewer of the live broadcast. As another example, the notifications can include comments and notices of viewers joining the live broadcast. As another example, the user interface may further be configured to scroll each of the plurality of icons from a starting location to an ending location on the display device during the predetermined interval.

As another example, a first icon of the plurality of icons associated with a first viewer of the plurality of viewers may have a different appearance than a second icon of the plurality of icons associated with a second viewer of the plurality of viewers. In some such implementations, the first icon may have a same shape but different fill color than the second icon. As another example, a shape of at least some of the plurality of icons is determined based on a date of the live broadcast. As another example, the user interface may be further configured to receive an identifier of a broadcaster, receive a notification that the broadcaster is starting the live broadcast; and provide, in response, the notification to view the live broadcast. As another example, the user interface may be further configured to display previous live broadcasts, receive a selection of a previous broadcast, and replay the selected previous broadcast in the display device, wherein the replay includes displaying a second plurality of icons at second respective times, the second plurality of icons representing signals of appreciation received at second respective times when the previous broadcast was live. As another example, the user interface may be further configured to receive a query from the user, provide the query to a server, and display a list of live broadcasts responsive to the query, the list including live broadcasts having comments or a title responsive to the query. As another example, the user interface may be further configured to display a notification about the live broadcast when the live broadcast has received a threshold quantity of signals of approval per a specified time period.

According to one aspect, a system includes at least one processor; and memory storing instructions that, when executed by the at least one processor, cause the system to perform operations. The operations may include determining map boundaries for display at a client device, the boundaries being based on a display scale for the client device, selecting, from among a plurality of live broadcasts, live broadcasts having a location within the map boundaries, clustering broadcasts based on the respective locations and map scale, and initiating display of a map having the map boundaries, wherein for each cluster of broadcasts, the map displays a representation of the cluster with an indication of a quantity of broadcasts in the cluster. In some implementations, the operations may also include receiving a selection of a representation for a first cluster and initiating display of at least some of the live broadcasts in the first cluster in as a list.

These and other aspects can include one or more of the following features. For example, the operations may also include determining, for each of the live broadcasts in the first cluster, a respective rate of signals of appreciation and giving live broadcasts with higher respective rates a position of prominence in the list. As another example, the operations may include determining, for each of the live broadcasts in the first cluster, a respective quantity of viewers and giving live broadcasts with higher quantity of viewers a position of prominence in the list. As another example, the operations may also include determining that a plurality of live broadcasts in the first cluster have locations that indicate the plurality of live broadcasts relate to a single event and providing at least one of the plurality in a position of prominence in the list. As another example, the operations may also include determining that a first live broadcast in the first cluster has a location that is also associated with a spike in social media messages and providing the first live broadcast in a position of prominence in the list. As another example, at least one of the live broadcasts in the first cluster may be displayed as a preview, the preview being selected based on signals of appreciation received.

According to one aspect, a method includes initiating a live feed broadcast from a source mobile device, determining, at regular periods during the live feed broadcast, a throughput between the source mobile device and a server and adjusting the quality of the live feed broadcast provided to the server, so that lower throughput results in a video stream with lower quality and a higher throughput results in a video stream with higher quality, and providing the live-feed broadcast to the server, wherein the server provides the live-feed video stream to a plurality of viewing devices, wherein the source device controls the quality of the broadcast for all viewing devices.

These and other aspects can include one or more of the following features. For example, the method may also include adding a timestamp packet to the video stream, the timestamp packet being used to associate engagements with a moment in time for display at the viewing devices and the source device. In some implementations, the method may include terminating the display of an engagement after a predetermined period of time has passed since the moment in time associated with the engagements. As another example, adjusting the quality of the live feed broadcast at regular periods results in a latency of less than five seconds.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   providing a live feed broadcast from a source mobile device to a plurality of viewing devices;
   receiving, during the live feed broadcast, a plurality of feedback signals, each feedback signal in the plurality of feedback signals being from one of the plurality of viewing devices;
   associating each feedback signal of the plurality of feedback signals with a respective time in the live feed broadcast;
   providing, for each feedback signal of the plurality of feedback signals, a first indication of the feedback signal to the source mobile device, wherein the source mobile device displays an animation of a symbol moving on a path for the first indication during the live feed broadcast; and
   adding, for each feedback signal of the plurality of feedback signals, a second indication of the feedback signal to the live feed so that an animation of a symbol moving on a path for the second indication is displayed on a viewing device during the live feed or during subsequent playback of the live feed subsequent to the respective time.

2. The method of claim 1, wherein the path of a first symbol overlaps with the path of a second symbol, the first symbol and the second symbol being for indications of two feedback signals of the plurality of feedback signals.

3. The method of claim 1, wherein an appearance of a first symbol differs from an appearance of a second symbol, wherein the first symbol and the second symbol are displayed concurrently on the viewing device.

4. The method of claim 1, wherein each animation lacks information identifying a user.

5. The method of claim 1, wherein users of the plurality of viewing devices each have a graph relationship with a user of the source mobile device in a social media platform and the users of the plurality of viewing devices view the live feed during concurrent sessions of the social media platform.

6. The method of claim 1, wherein, each animation fades a predetermined time after the respective time associated with the feedback signal.

7. The method of claim 1, wherein, for each moving animated symbol, the animation of the symbol moves the symbol in a non-linear general direction between a first location and a second location.

8. The method of claim 1, wherein a shape of a moving animated symbol signifies a feedback signal.

9. A system comprising:
   at least one processor;
   a display device; and
   memory storing instructions that, when executed by the at least one processor, generate a user interface configured to:

receive an acceptance of a notification regarding a live broadcast, display the live broadcast on the display device, initiate display on the display device of a plurality of animated symbols with the live broadcast, each animation of a symbol moving the symbol on a path and representing a signal of appreciation from one of a plurality of viewers of the live broadcast, wherein each animated symbol is associated with a respective time in the live broadcast, initiate removal of the plurality of animated symbols from the display device, the removal of an animated symbol of the plurality of animated symbols occurring after a predetermined interval elapses after the respective time associated with the animated symbol, initiate display of, on the display device, a plurality of notifications with the live broadcast, each notification of the plurality of notifications being from one of the plurality of viewers and being associated with a respective time in the live broadcast, and initiate removal of the plurality of notifications from the display, the removal of a notification of the plurality of notifications being based on the respective time of the notification, wherein the user interface is configured to display animated symbols and notifications concurrently.

10. The system of claim 9, wherein the system further comprises an input device, and the live broadcast is provided from a server and the user interface is further configured to:

receive a signal of appreciation via the input device; and provide the signal to the server, wherein the server associates the signal of appreciation with a respective time in the live broadcast, adds an indication in the live broadcast for the signal at the respective time, and provides the indication with the live broadcast to the server.

11. The system of claim 9, wherein at least some of the plurality of animated symbols are from a same viewer of the live broadcast.

12. The system of claim 9, wherein the path is a non-linear general direction between a starting location and an ending location on the display.

13. The system of claim 9, wherein a first symbol of the plurality of animated symbols associated with a first viewer of the plurality of viewers has a different appearance than a second symbol of the plurality of animated symbols associated with a second viewer of the plurality of viewers.

14. The system of claim 9, wherein a shape of at least some of the plurality of animated symbols signifies a signal of appreciation.

15. The system of claim 9, wherein each of the plurality of animated symbols moves independent of other animated symbols.

16. The system of claim 9, wherein the user interface is further configured to:

display previous live broadcasts;

receive a selection of a previous broadcast; and replay the selected previous broadcast in the display device, wherein the replay includes displaying a second plurality of animated symbols at second respective times, the second plurality of animated symbols representing signals of appreciation received at second respective times when the previous broadcast was live.

17. The system of claim 9, wherein the user interface is further configured to:

receive a query from a user;

provide the query to a server; and display a list of live broadcasts responsive to the query, the list including live broadcasts having comments or a title responsive to the query.

18. The system of claim 9, wherein the user interface is further configured to:

display a notification about the live broadcast when the live broadcast has received a threshold quantity of signals of appreciation per a specified time period.

19. The system of claim 9, wherein the notifications include comments and notices of viewers joining the live broadcast.

20. A method comprising:

receiving an acceptance of a notification regarding a live broadcast;

displaying the live broadcast on a display device responsive to receiving the acceptance;

receiving, with the live broadcast, a plurality of feedback signals from a plurality of viewers of the live broadcast, each feedback signal being associated with a respective time in the live broadcast; and displaying, for each feedback signal of the plurality of feedback signals, a respective animated symbol, each respective animated symbol being removed from the display device responsive to a predetermined interval elapsing after the respective time and the respective animated symbol travels a non-linear path during the predetermined interval, wherein the predetermined interval is a few seconds.

* * * * *

UNITED STATES PATENT AND TRADEMARK OFFICE
CERTIFICATE OF CORRECTION

PATENT NO. : 10,904,632 B2
APPLICATION NO. : 16/565070
DATED : January 26, 2021
INVENTOR(S) : Bernstein et al.

Page 1 of 1

It is certified that error appears in the above-identified patent and that said Letters Patent is hereby corrected as shown below:

In the Claims

In Column 35, Claim 12, Line 43, delete "display." and insert --display device.--, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*